(12) United States Patent
Costin et al.

(10) Patent No.: US 12,403,873 B2
(45) Date of Patent: *Sep. 2, 2025

(54) LEVERAGING REAR-VIEW SENSORS FOR AUTOMATIC EMERGENCY BRAKING IN AUTONOMOUS MACHINE APPLICATIONS

(71) Applicant: NVIDIA Corporation, Santa Clara, CA (US)

(72) Inventors: Mark Henry Costin, Sunnyvale, CA (US); Jonathan Sweedler, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/404,488

(22) Filed: Jan. 4, 2024

(65) Prior Publication Data

US 2024/0140374 A1 May 2, 2024

Related U.S. Application Data

(63) Continuation of application No. 17/845,988, filed on Jun. 21, 2022, now Pat. No. 11,891,036, which is a
(Continued)

(51) Int. Cl.
*B60T 7/22* (2006.01)
*B60Q 9/00* (2006.01)
(Continued)

(52) U.S. Cl.
CPC ............... *B60T 7/22* (2013.01); *B60Q 9/008* (2013.01); *B60T 8/171* (2013.01); *B60T 8/172* (2013.01);
(Continued)

(58) Field of Classification Search
CPC . B60Q 9/008; B60T 7/22; B60T 8/171; B60T 8/172; B60T 2201/022; B60T 2201/024; B60T 2210/30; B60T 2230/02
(Continued)

(56) References Cited

U.S. PATENT DOCUMENTS 11,079,764 B2 * 8/2021 Nister .................. G05D 1/0221
11,891,036 B2    2/2024 Costin et al.
(Continued)

FOREIGN PATENT DOCUMENTS

CN     109080608 A    12/2018
CN     110155046 A     8/2019
(Continued)

OTHER PUBLICATIONS

Costin, Mark Henry; Non-Final Office Action for U.S. Appl. No. 17/845,988, filed Jun. 21, 2022, mailed Jun. 1, 2023, 10 pgs.
(Continued)

*Primary Examiner* — Atul Trivedi
(74) *Attorney, Agent, or Firm* — Taylor Duma L.L.P.

(57) ABSTRACT

In various examples, activation criteria and/or braking profiles corresponding to automatic emergency braking (AEB) systems and/or collision mitigation warning (CMW) systems may be determined using sensor data representative of an environment to a front, side, and/or rear of a vehicle. For example, activation criteria for triggering an AEB system and/or CMW system may be adjusted by leveraging the availability of additional information with regards to the surrounding environment of a vehicle—such as the presence of a trailing vehicle. In addition, the braking profile for the AEB activation may be adjusted based on information about the presence of and/or location of vehicles to the front, rear, and/or side of the vehicle. By adjusting the activation criteria and/or braking profiles of an AEB system, the potential for
(Continued)

collisions with dynamic objects in the environment is reduced and the overall safety of the vehicle and its passengers is increased.

20 Claims, 9 Drawing Sheets

Related U.S. Application Data continuation of application No. 16/833,165, filed on Mar. 27, 2020, now Pat. No. 11,364,883.

(51) Int. Cl.
  *B60T 8/171* (2006.01)
  *B60T 8/172* (2006.01)
(52) U.S. Cl.
  CPC ..... *B60T 2201/022* (2013.01); *B60T 2210/30* (2013.01); *B60T 2230/02* (2013.01)
(58) Field of Classification Search
  USPC ............................................................ 701/70
  See application file for complete search history.

(56) References Cited

U.S. PATENT DOCUMENTS

| | | |
|---|---|---|
| 2011/0190972 A1 | 8/2011 | Timmons et al. |
| 2012/0283927 A1 | 11/2012 | Reinisch et al. |
| 2014/0142798 A1 | 5/2014 | Guarnizo Martinez et al. |
| 2015/0012204 A1 | 1/2015 | Breuer et al. |
| 2017/0267234 A1 | 9/2017 | Kemp et al. |
| 2018/0052463 A1 | 2/2018 | Mays |
| 2018/0072224 A1* | 3/2018 | Hecker ................... B60T 8/32 |
| 2018/0151074 A1 | 5/2018 | Noto et al. |
| 2018/0154777 A1 | 6/2018 | Hall et al. |
| 2018/0257647 A1 | 9/2018 | Jurca et al. |
| 2018/0370502 A1* | 12/2018 | Wang ..................... B60T 8/174 |
| 2018/0370503 A1 | 12/2018 | Graney |
| 2019/0212749 A1 | 7/2019 | Chen et al. |
| 2019/0250622 A1 | 8/2019 | Nister et al. |
| 2019/0258251 A1 | 8/2019 | Ditty et al. |
| 2019/0291728 A1* | 9/2019 | Shalev-Shwartz .... B60W 30/09 |
| 2019/0303759 A1 | 10/2019 | Farabet et al. |
| 2020/0082248 A1 | 3/2020 | Villegas et al. |
| 2020/0294401 A1 | 9/2020 | Kerecsen |
| 2020/0297063 A1* | 9/2020 | Andon .................... B60Q 9/008 |
| 2020/0341466 A1* | 10/2020 | Pham .................... G06V 10/454 |
| 2020/0361430 A1* | 11/2020 | Kim ........................ B60T 8/171 |
| 2021/0073559 A1 | 3/2021 | Pyo |
| 2021/0197805 A1* | 7/2021 | Robbel ................. G06V 10/764 |
| 2021/0197807 A1* | 7/2021 | Park ..................... B60W 40/105 |
| 2021/0201145 A1* | 7/2021 | Pham ....................... G06N 3/08 |
| 2021/0221369 A1* | 7/2021 | Kashefy ................. B60Q 1/444 |
| 2021/0253128 A1* | 8/2021 | Nister .................... G05D 1/646 |
| 2021/0286923 A1 | 9/2021 | Kristensen et al. |
| 2021/0294944 A1 | 9/2021 | Nassar et al. |
| 2021/0295171 A1* | 9/2021 | Kamenev ............... G06N 3/088 |
| 2021/0300306 A1 | 9/2021 | Costin et al. |
| 2021/0380099 A1* | 12/2021 | Lee ....................... G08G 1/0141 |
| 2022/0289198 A1* | 9/2022 | Schmitt ............... B60W 50/082 |
| 2022/0314942 A1* | 10/2022 | Costin ...................... B60T 7/22 |
| 2023/0022820 A1* | 1/2023 | Ogino ................. B60T 8/17558 |
| 2023/0037767 A1* | 2/2023 | Yang ...................... G08G 1/167 |
| 2023/0391374 A1* | 12/2023 | Chen ..................... G06N 3/088 |
| 2023/0398965 A1* | 12/2023 | Shah ...................... B60K 35/21 |
| 2024/0359624 A1* | 10/2024 | Perez Barrera ........ B60Q 9/008 |

FOREIGN PATENT DOCUMENTS

| | | | |
|---|---|---|---|
| CN | 111562118 A * | 8/2020 | ........ G01M 17/0078 |
| CN | 105799699 B | 9/2020 | |
| DE | 102019219367 A1 | 6/2021 | |
| EP | 3663144 B1 | 12/2021 | |
| JP | 7346401 B2 * | 9/2023 | .......... B60W 50/023 |
| KR | 20180053995 A | 5/2018 | |
| KR | 101897466 B1 | 9/2018 | |
| WO | 2011092216 A1 | 8/2011 | |
| WO | 2012052084 A1 | 4/2012 | |
| WO | 2019235327 A1 | 12/2019 | |
| WO | WO-2020245654 A1 * | 12/2020 | ............ B60W 30/09 |

OTHER PUBLICATIONS

Costin, Mark Henry; Notice of Allowance for U.S. Appl. No. 17/845,988, filed Jun. 21, 2022, mailed Sep. 22, 2023, 12 pgs.

* cited by examiner

LEVERAGING REAR-VIEW SENSORS FOR AUTOMATIC EMERGENCY BRAKING IN AUTONOMOUS MACHINE APPLICATIONS

CROSS-REFERENCE TO RELATED APPLICATIONS

This application is a continuation of U.S. Non-Provisional application Ser. No. 17/845,988, filed Jun. 21, 2022, which is a continuation of U.S. Non-Provisional application Ser. No. 16/833,165, filed on Mar. 27, 2020. Each of which is hereby incorporated by reference in its entirety.

BACKGROUND

Avoiding collisions with objects—such as other vehicles, pedestrians, bicyclists, and the like—is a primary focus of modern autonomous and semi-autonomous machine applications. For example, many vehicles are equipped with automatic emergency braking (AEB) systems and/or collision mitigation warning (CMW) systems as part of an Advanced Driver Assistance System (ADAS), and include a combination of hardware and software that is used to detect a potential impending forward collision with another object in time to avoid or mitigate the crash. To assist when drivers become inattentive and/or an unpredicted situation is presented, these AEB systems may cause the brakes of the vehicle to automatically engage to assist in preventing or reducing the severity of a collision. For CMW systems, a signal—e.g., audible, visual, or otherwise—may be generated to warn the driver of an impending collision.

However, conventional AEB systems are designed to avoid false positives and thus only brake the vehicle when there is high confidence that a collision is imminent. For example, AEB systems in production may address false braking using two paths that are implemented with sensor diversity (e.g., two or more of RADAR, LIDAR, SONAR, ultrasonic, cameras, etc.). As a result, where a collision is possible, but one of the determinations is not to brake, the AEB system may not activate resulting in a false negative event and a collision may ensue. Because AEB systems are considered a driver assistance feature, for any false negative (e.g., missed braking event), the driver is responsible for detecting the object-in-path and braking. Similarly, in conventional AEB systems where a single path is implemented, either the confidence threshold for activating AEB may be so high that false negative events may occur leading to collisions or too low, resulting in false positive detections that cause unnecessary braking events, which could lead to passenger discomfort or even a rear collision with a trailing vehicle.

Furthermore, conventional AEB systems limit their field of view or sensory field to portions of the environment in front of the vehicle. With this limited information, AEB systems do not take into account any trailing vehicles or objects. As a result, conventional AEB systems generally only include a single braking torque profile—which is to brake as fast as possible as late as possible—when a determination to brake is made. This can result in a rear collision with an undetected trailing vehicle even where the forward collision is avoided.

Furthermore, traditional AEB systems apply the brakes of a vehicle in the same manner regardless of the vehicle's environment. For example, the AEB system will apply the brakes the same way regardless of whether there is ample space in front of vehicle that would allow for more time to brake. As another example, conventional AEB systems disregard activity in the rear of vehicle when deciding the level at which to engage the brakes. By uniformly applying a vehicle's brakes with no consideration of a vehicle's environment, current AEB systems may not brake efficiently and may apply full force causing unnecessary jerking of the vehicle's passengers.

SUMMARY

Embodiments of the present disclosure relate to leveraging rear-view sensors for automatic emergency braking in autonomous machine applications. Systems and methods are disclosed that receive and analyze sensor data of a vehicle representative of a front-view, side-view, and/or rear-view of the vehicle. By analyzing the sensor data from multiple perspectives of a vehicle, an automatic emergency braking (AEB) system and/or a collision mitigation warning (CMW) system of the vehicle may make activation determinations that are more in tune with the surrounding environment of the vehicle. For example, trigger or activation thresholds for single or multi-path AEB systems may be adjusted based on the presence of other actors to the front, side, and/or rear of the vehicle—e.g., where another actor is trailing the vehicle, the activation threshold may be increased to avoid a collision with the trailing actor. Additionally, based on the analyzed sensor data and activation criteria being met, embodiments of the present disclosure may determine the proper amount of force—e.g., corresponding to a braking profile—to apply when the AEB system is activated. In this manner, embodiments of the present disclosure leverage a more holistic understanding of the surrounding environment of a vehicle—including the environment to a rear and/or a side of the vehicle—to make dynamic adjustments to activation criteria and/or braking profiles corresponding to an AEB system of the vehicle.

BRIEF DESCRIPTION OF THE DRAWINGS

The present systems and methods for leveraging rear-view sensors for automatic emergency braking (AEB) in autonomous machine applications are described in detail below with reference to the attached drawing figures, wherein.

DETAILED DESCRIPTION

Figure 1:
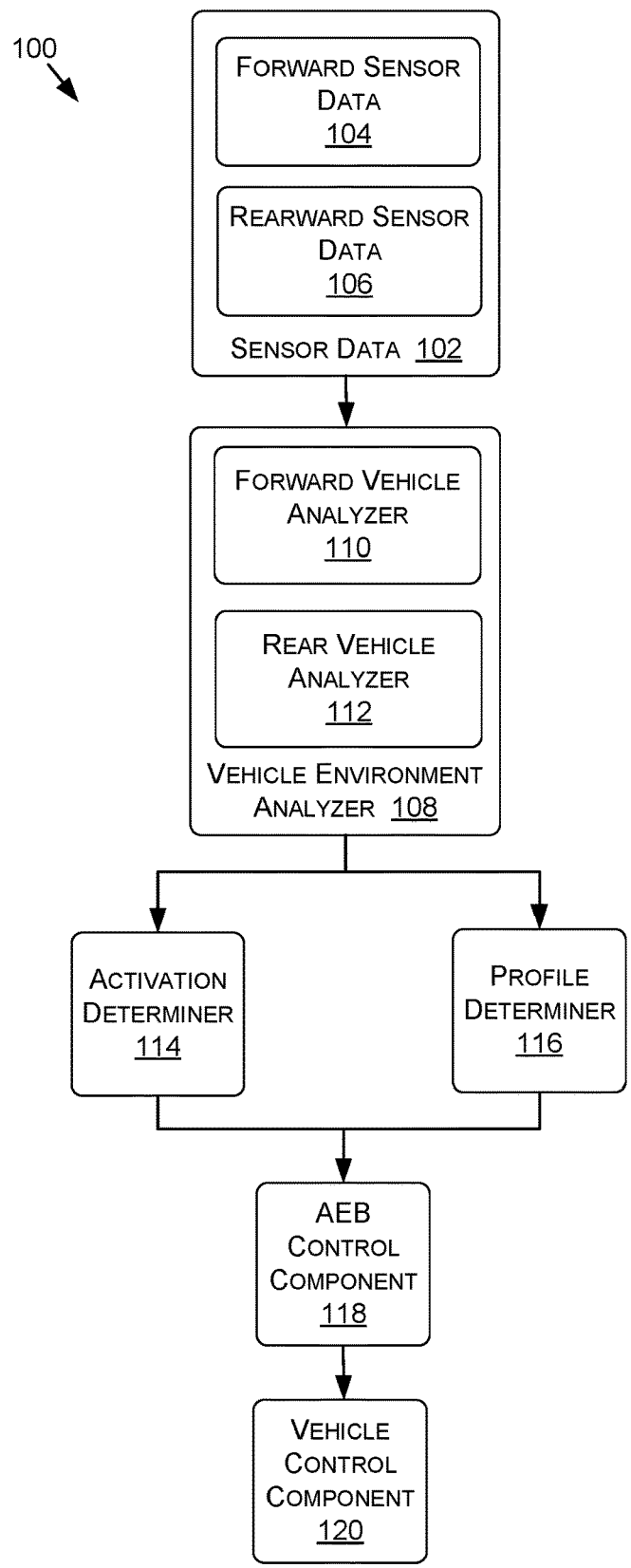
FIG. 1 is a block diagram of an example system architecture for leveraging rear-view sensors for AEB in autonomous machine applications, in accordance with some embodiments of the present disclosure.

Systems and methods are disclosed related to leveraging rear-view sensors for automatic emergency braking (AEB) in autonomous machine applications. Although the present disclosure may be described with respect to an example autonomous vehicle 400 (alternatively referred to herein as "vehicle 400", "ego-vehicle 400", or "autonomous vehicle 400," an example of which is described with respect to FIGS. 4A-4D, this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving or ADAS systems—and specifically with respect to AEB systems and collision mitigation warning (CMW) systems—this is not intended to be limiting. For example, the systems and methods described herein may be used in a simulation environment (e.g., to test accuracy of an AEB system and/or a CMW system during simulation), in robotics, aerial systems, boating systems, and/or other technology areas, such as for control operations, obstacle and collision avoidance, and/or other processes.

Systems and methods disclosed herein relate to adjusting the AEB and/or CMW triggering point or level and/or adjusting a braking profile (e.g., an amount of torque over time) while accounting for objects to the rear of the vehicle. In contrast to conventional systems, such as those described herein, the system of the present disclosure may leverage information with regards to objects to the front, side, and rear of the vehicle to make AEB activation and braking profile decisions. For example, using LIDAR sensors, RADAR sensors, ultrasonic sensors, cameras, and/or other sensor types, embodiments of the present disclosure are able to detect objects to a rear of the vehicle to determine an AEB activation trigger or level. In such an example, when an object is not detected to the rear of the vehicle, the AEB activation trigger may be reduced relative to when an object is present, or when an object is closely trailing Where no trailing vehicle or other dynamic object is detected, for example, the AEB activation trigger selected may only require that a single path or determination to indicate that AEB should be activated. Where a vehicle is trailing, but is beyond a threshold distance or is also braking, the AEB activation trigger selected may require both determination paths be in agreement, but the braking profile may be adjusted to allow for a more aggressive braking profile—e.g., because the likelihood of collision with the trailing vehicle is reduced. As another example, where a vehicle is closely trailing, the AEB activation trigger may be the strictest, and may require that all sources of activation determinations are in agreement. In addition, in such an example, the distance and/or actions of the object to the front of the vehicle that caused the AEB activation determinations may be taken into account—e.g., if the object is not stopped or braking, or is beyond a threshold distance, the braking profile selected may be less aggressive, allowing the vehicle to come to a stop over a longer period of time to aid in avoiding a collision with the trailing vehicle.

As described herein, the braking profile for the AEB activation may be adjusted based on information about the presence and location of objects to the front, rear, and/or side of the vehicle. For example, where an object is not trailing, the braking profile may be more aggressive, where an object is trailing at a distance, the braking profile may be aggressive but less aggressive than when no object is present, and where an object is closely trailing, the braking profile may be less aggressive so long as a collision with the object forward of the vehicle will be avoided or at least mitigated. In addition, past trajectories and/or predicted trajectories of objects in the environment may be leveraged for braking profile determinations. For example, where an object is in an adjacent lane and speeds up to pass and change lanes closely in front of the vehicle causing the AEB system to activate, this trajectory information may be tracked in order to allow for a less aggressive braking profile where a trailing vehicle is present—e.g., because the passing object is likely to continue to gain distance from the vehicle. As such, by accounting for objects around the vehicle—and not only to the front of the vehicle—the AEB system may engage with varying braking profiles to increase the likelihood of collision avoidance, to reduce the likelihood of mechanical issues from excess torque on the vehicle, and to make the experience of passengers more enjoyable by not executing braking with unnecessary amounts of force.

As one example showcasing the benefits of the present disclosure, consider a scenario where a trailing object is following a vehicle very closely. If the vehicle analyzes and determines that the AEB system needs to be engaged due to a potential collision to the front of the vehicle (as a result of another object), the AEB system of the present disclosure may also leverage information about the trailing object—e.g., the distance of the object from the vehicle, the speed of the object, whether the object is braking, etc.—to determine whether the vehicle should adjust the AEB activation level and/or braking profile to avoid or reduce the severity of a collision with the trailing object. In some scenarios, the braking profile may be adjusted even if it means some impact with an object to the front of the vehicle, if this determination is likely to reduce the collective severity of the collision(s).

As such, embodiments of the present disclosure leverage the availability of additional information with regards to the surrounding environment to adjust AEB activation triggers or levels and/or braking profiles for when AEB activation occurs. In contrast to conventional systems, the adjustment of the AEB activation triggers may allow the vehicle to account for false negatives in a way that does not affect other objects in the environment—e.g., because the AEB activation trigger may still be stricter when a trailing vehicle is present. In addition, by adjusting the braking profiles, the potential for collision with objects to the front, rear, and side of the vehicle may be reduced, and the overall safety and security of the passengers of the vehicle as well as the surrounding objects may be increased.

Now with reference to FIG. 1, FIG. 1 is an example system 100 suitable for leveraging rear-view sensors for AEB in autonomous machine applications, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

At a high level, the system 100 may execute a process for AEB determinations—e.g., as indicated by the flow of the arrows FIG. 1. However, the illustration of FIG. 1 is not intended to be limiting, and the process may be executed in a different order and/or may include additional or alternative components, features, and/or data than the illustration of FIG. 1. The system 100 may process sensor data 102 through a vehicle environment analyzer 108, an activation determiner 114, a profile determiner 116, an AEB control component 118, a vehicle control component 120, and/or one or more additional or alternative components, features, modules, and/or functionalities. In some non-limiting embodiments, depending on the particular implementation, some components may contain one or more sub-components. For example, the vehicle environment analyzer 108 may be comprised of and/or include a forward vehicle analyzer 110 and rear vehicle analyzer 112. In addition, although the sensor data 102 is illustrated as including forward sensor data 104 and rearward sensor data 106, this is not intended to be limiting. The sensor data 102 may include sensor data from sensors with fields of view and/or sensory fields that capture any portion of the environment around the vehicle 400.

In some embodiments, the sensor data 102 may include any type of sensor data, such as but not limited to image data from one or more cameras, LIDAR data from one or more LIDAR sensors 464, RADAR data from one or more RADAR sensors 460, audio data from one or more microphones 496, sensor data 102 from one or more other sensors of the vehicle 400, and/or sensor data 102 from one or more sensors of another object type (e.g., a robot, a watercraft, etc.). In some examples, the activation determiner 114 and/or the profile determiner 116 may use output from the vehicle environment analyzer 108 to determine activation criteria and/or a brake profile setting, respectively, based on the sensor data 102. The outputs from the activation determiner 114 and/or the profile determiner 116 may be used by control component(s) of the vehicle 400 (e.g., controller(s) 436, ADAS system 438, SOC(s) 404, software stack 422, and/or other components of the autonomous vehicle 400) to aid the vehicle 400 in performing one or more operations (e.g., activation criteria determination, braking profile determination, etc.) within an environment.

In embodiments, the sensor data 102 may be comprised of the forward sensor data 104, the rearward sensor data 106, and/or other sensor data from one or more additional or alternative fields of view or sensory fields of the vehicle 400. In a non-limiting embodiment, forward sensor data 104 may generally include any type of sensor data with a field of view to a front of the vehicle 400 (e.g., image data captured by one or more cameras of the autonomous vehicle 400 in the front portion of the vehicle 400 and/or with a field of view thereof, sensor data from forward-facing LIDAR sensors and/or RADAR sensors, etc.). Similarly, in a non-limiting embodiment, rearward sensor data 104 may generally include any type of sensor data with a field of view to a rear of the vehicle 400 (e.g., image data captured by one or more cameras of the autonomous vehicle 400 in the rear portion of the vehicle 400 and/or with a field of view thereof, sensor data from rearward-facing LIDAR sensors and/or RADAR sensors, etc.). As such, the sensor data 102 may include image data and other sensor data types that represent fields of view and/or sensory fields from multiple perspectives of the vehicle 400. Thus, any number of sensors may be deployed within the system 100 and leveraged by the vehicle environment analyzer 108, the activation determiner 114, the profile determiner 116, and/or other components of the system 100. As a result, the sensor data 102 captured from multiple perspectives of the vehicle 400 may allow for enhanced perception in AEB and/or CMW system—thereby resulting in a safer, more comfortable ride for the passengers of the vehicle 400.

The vehicle environment analyzer 108 may use as input one or more images and/or other sensor data representations (e.g., LIDAR data, RADAR data, etc.) as represented by sensor data 102. The vehicle environment analyzer 108 may analyze the sensor data 102 to determine whether an object is detected in at least a portion of the field of view and/or sensory field to a front, side, and/or rear of the vehicle 400. In some non-limiting embodiments, the vehicle analyzer 108 may include a forward vehicle analyzer 110 (e.g., to process information corresponding to a rear of the vehicle 400) and a rear vehicle analyzer 112 (e.g., to process information corresponding to a front of the vehicle 400). However, this is not intended to be limiting, and the system 100 may include additional or alternative analyzers, such as a side vehicle analyzer, an upward vehicle analyzer, and/or the like.

In any example, the vehicle environment analyzer 108 may analyze or otherwise process the sensor data 102 to determine if a vehicle or other dynamic actor is present to a front, rear, and/or side of the vehicle 400. In addition, information corresponding to any detected vehicles or dynamic actors may be determined by the vehicle environment analyzer 108—such as a distance of the actor from the vehicle 400, a speed, velocity, acceleration, or deceleration of the actor, whether or not the actor is braking, changing lanes, providing another signal, or making another maneuver, and/or the like. In some embodiments, the vehicle environment analyzer 108 may track other vehicles or actors over time to determine past trajectories and/or estimate future trajectories, and the system 100 may use this information to further understand the surrounding environment for making activation trigger determinations and/or setting braking profiles.

Once an understanding of the surrounding vehicle 400 is determined using the vehicle environment analyzer 108, the activation determiner 114 and/or the profile determiner 116 may perform additional operations based on the vehicle surroundings. For example, at a high level, the activation determiner 114 may determine—dynamically, in embodiments—activation criteria for activating or triggering an AEB and/or CMW system based on the existence of, locations of, and/or information related to other vehicles or dynamic actors in the environment. The activation criteria may include, without limitation, one or more criteria that are to be met to activate the AEB and/or CMW and/or that—when not met—do not cause activation of these systems. As such, the activation determiner 114 may analyze the information of the surrounding environment of the vehicle 400 and adjust, change, or otherwise set the activation criteria at any point in time. For example, where a single path or input criteria is used or available to the AEB and/or CMW system, the activation determiner 114 may set a threshold—such as a confidence threshold—that defines the activation criteria at that period of time. As another example, where two or more paths or input criteria area used or available to the AEB and/or CMW system, the activation determiner 114 may adjust thresholds for one or more of the paths, may require that only one of the paths be satisfied (e.g., provide an indication that AEB and/or CMW should be triggered), and/or may require that two or more of the paths be satisfied. As a result, the activation determiner 114 may leverage the information from the vehicle environment analyzer 108 to set an activation trigger or criteria for the vehicle 400.

As an example, if the activation determiner 114 determines—e.g., based on the output of the vehicle environment analyzer 108—that a vehicle in front the ego-vehicle 400 is braking or that the ego-vehicle is otherwise closing a gap between the two vehicles, and the activation determiner 114 determines that there is no rear trailing vehicle, the activation determiner 114 may set the activation criteria such that the AEB and/or CMW system may brake, otherwise slow down, and/or provide a warning signal earlier and/or based on a lower degree of certainty that an object is present to the front of the vehicle. This determination may be made because the risk of a rear collision is reduced when there are no trailing vehicles determined to be present, so a false positive induced braking and/or warning may not increase risk and may actually potentially increase safety of the passengers and the surrounding vehicles by not increasing the activation threshold so high as to cause a false negative. In a similar situation, but where a trailing vehicle is present, the activation determiner 114 may determine to increase the confidence or activation standard because a false positive braking may increase the likelihood of a collision with the rear-trailing vehicle. In such an example, where two input criteria (e.g., a LIDAR data input and an image data input) are relied upon for the AEB and/or CMW system, the activation criteria may require that both input criteria provide an indication that the AEB and/or CMW system should be activated prior to activating the system(s). As another example, where a vehicle is passing the ego-vehicle 400 and a rear-trailing vehicle is present, the trajectory of the vehicle may be monitored such that, even where the vehicle cuts closely in front of the ego-vehicle 400, the activation criteria may be reduced to avoid activating AEB and/or CMW as a result of the other vehicle cutting in front of the ego-vehicle. This determination may be made by the activation determiner 114 because the likelihood of a collision is reduced when a vehicle is changing lanes and cutting in front of the ego-vehicle 400, so the tracking of the vehicle trajectory through the lane change may provide an indication to the ego-vehicle 400 that the AEB and/or CMW activation criteria may be increased and may thus not result in a false positive where a trailing vehicle is present. In a similar situation but with a trailing vehicle present, the AEB and/or CMW activation criteria may be relaxed such that activation is more likely, because without a trailing vehicle present the only current risk is the cut-in vehicle, so preemptively applying the brakes may provide the greatest net increase in safety. In addition, as described in more detail herein with respect to the profile determiner 116, in any of these examples the braking profile of the AEB system may be adjusted based on the surrounding environment such that each AEB activation does not result in an abrupt braking action—especially where no rear vehicle is present and/or a forward vehicle is accelerating, is a greater distance from the ego-vehicle, and/or the like.

The profile determiner 116 may determine—dynamically, in embodiments—a braking profile setting for the vehicle 400 based on information output by the vehicle environment analyzer 108. For example, the profile determiner 116 may determine and/or set a level, sensitivity, trajectory (e.g., in three-dimensional (3D) world-space), path, and/or other criteria or output corresponding to the braking profile. As such, based on information of dynamic actors (e.g., presence, location, speed, actions such as braking, changing lanes, etc.) in the surrounding environment of the vehicle 400 and/or the activation criteria (e.g., relaxed, strict, etc.), the profile determiner 116 may set the braking profile for the ego-vehicle 400. In some embodiments, the braking profile may be set prior to activation of AEB such that, if activated, the braking profile for the AEB will be in accordance with the preset braking profile. In other embodiments, the braking profile may be set at the time of and/or after activation of the AEB, such that, once activated, the information from the vehicle environment analyzer 108 may be used to determine the safest and/or most effective braking profile for the ego-vehicle 400.

In a non-limiting embodiment, the profile determiner 166 may determine the braking profile setting for the vehicle 400 based on characteristics of the vehicle 400. For example, if the vehicle 400 is a semi-trailer truck, the profile determiner 116 may adjust the braking profile setting to take into account the weight of the semi-trailer truck and apply brake pressure in way fits to a semi-trailer truck. In another non-limiting embodiment, the profile determiner 116 may also determine the braking profile setting for a vehicle based on environmental characteristics. For example, based on the weather conditions or conditions of the roadway (e.g., wet, snow, dirt, gravel, potholes (e.g., as determined using an HD map, one or more deep neural networks, etc.), speed bumps, uneven pavement, etc.), the braking profile setting of a vehicle may be adjusted to take into account the weather and/or other road conditions. As such, where the driving surface is icy or wet, the profile determiner 116 may adjust the braking profile to brake less aggressively and also brake in a gradual manner to avoid slipping or sliding. Additionally, in non-limiting embodiments, the activation criteria be further based on the past trajectory of detected objects. For example, as described in an example above, where a vehicle is passing the ego-vehicle 400 and then cuts in front of the ego-vehicle, this past trajectory information may be leveraged to determine that the braking profile should be less aggressive due to the likelihood that the cut-in vehicle is going to continue to accelerate and create distance from the ego-vehicle. Thus, the profile determiner 116 may determine the braking profile setting based on any or all available sensor data 102, determinations by the vehicle environment analyzer 108, HD map data, determinations by the activation determiner, and/or information from one or more other systems of the vehicle 400 that may deploy one or more deep neural networks (e.g., drivable free-space information, road profile information, lane location and type information, wait condition information, predicted future trajectory information of surrounding actors, etc.).

As another example, consider when there is a vehicle a short distance to the front of the ego-vehicle 400, but there is no rear trailing vehicle. In this case, the profile determiner 116 may determine that the braking profile can be aggressive or adjusted to brake the vehicle more quickly because there is less of a risk of a rear collision—thereby allowing the ego-vehicle 400 to brake hard to ensure that a forward collision is avoided. In a similar scenario where a trailing vehicle is present, the braking profile may be less aggressive—e.g., the least aggressive to still avoid a forward collision—to avoid or reduce the impact of a rear collision with the rear-trailing vehicle. In some scenarios, such as where a front and rear vehicle are within close proximity to the ego-vehicle, the braking profile may be set by the profile determiner 116 to reduce the overall intensity or damage from a collision with the front and/or rear trailing vehicle. As such, where a collision seems inevitable, the braking profile may be determined to cause the lowest net damage and/or the greatest net safety.

Referring now to FIGS. 2A-2D, FIGS. 2A-2D depict example scenarios for leveraging rear-view and/or other surrounding sensors for AEB in autonomous machine applications, in accordance with some embodiments of the present disclosure. For the purposes of discussion, it may be assumed that some, none, or all of the cars illustrated in FIGS. 2A-2D include AEB and/or CMW systems—such as but not limited to those described herein with respect to the system 100. As such, activation determinations and/or braking profiles may be discussed with respect to each different car within a single illustration, or may be discussed with one or more cars within a single illustration. In examples where two or more cars or other dynamic actors have AEB and/or CMW systems similar to those described herein, the cumulative benefit may serve to further increase the safety and reliability of the AEB and/or CMW systems.

Figure 2A:
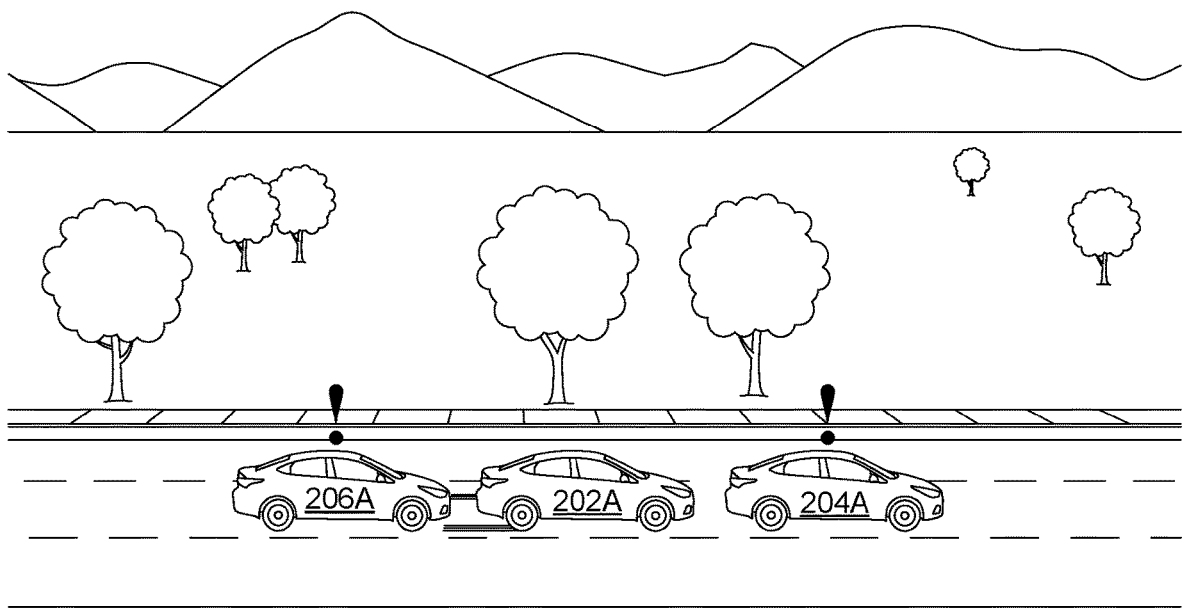
FIGS. 2A-2D depict example scenarios for leveraging rear-view sensors for AEB in autonomous machine applications, in accordance with some embodiments of the present disclosure.

With reference to FIG. 2A, FIG. 2A shows three cars 202A, 204A, and 206A in the middle lane of a three-lane highway (although it is contemplated that the location of the cars in FIG. 2A are for example purposes only and cars 202A, 204A, and 206A may be located in any suitable environment and/or orientation or pose therein). As shown, the car 204A is within a short distance in front of the car 202A and the car 206A is within a short distance behind the car 202A. Employing embodiments of the system 100 discussed in conjunction with at least FIG. 1, the car 202A may determine that the car 206A is following too closely based on the short distance between the car 202A and the car 204A. As such, the activation criteria and braking profile setting of the AEB system in the car 202A may be adjusted based on the sensor data analyzed and representative of the car 206A and the car 204A. As such, as indicated by braking lines on the road surface, the car 202A would likely have to brake quickly over a short distance to avoid a collision with one or both of the cars 206A and 204A (e.g., a potential collision being denoted by an exclamation point "!"). For example, if the car 206A is not braking when the car 202A engages its AEB system (e.g., because activation criteria has not been met), the braking profile setting of the car 202A may be adjusted to lessen the collision with the car 206A, even if it means minimal impact with the car 204A. To determine whether the car 206A is braking, the sensor data 102 may be analyzed—over time—to determine that the car 206A is decelerating and/or beginning to increase its distance from the car 202A. By analyzing the rearward sensor data of the car 202A, embodiments of the present disclosure can measure the distance over time of the car 206A and determine its velocity as well as determine the trajectory of the car 206A. In this way, embodiments of the present disclosure may be employed in the car 202A to determine activation criteria and determine the braking profile setting based on analyzed data regarding the car 204A and the car 206A.

In some instances, the car 202A may not adjust the activation criteria or braking profile setting based on analyzed sensor data regarding the car 204A and the car 206A. For example, where it is determined that the car 204A and the car 206A are maintaining a consistent speed and their trajectory is not expected to change, the activation criteria and braking profile setting of the AEB system in the car 202A may not be adjusted. However, in other situations, where one or both of the car 204A and the car 206A changes its speed and/or trajectory, the activation criteria and braking profile setting of the AEB system in the car 202A may be adjusted accordingly.

Figure 2B:
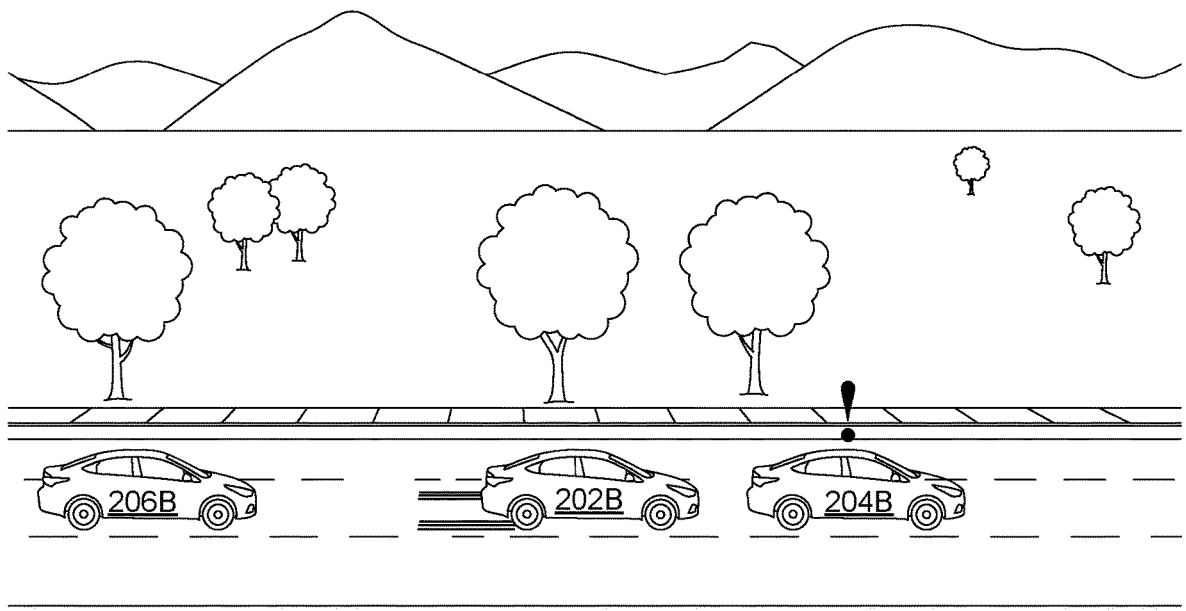

Turning now to FIG. 2B, FIG. 2B shows three cars 202B, 204B, and 206B in the middle lane of a three-lane highway. As shown, the car 204B is within a short distance in front of the car 202B and the car 206B is within a further distance behind the car 202B. Employing embodiments of the system 100 discussed in conjunction with at least FIG. 1, the car 202B may adjust the activation criteria and/or braking profile setting of its AEB system to be more aggressive given the amount of space from car 206B. In this way, the car 202B may adjust the activation criteria to be more sensitive (e.g., more strict, requiring a higher confidence that the car 204B or other actor is present and/or within a threshold distance to the front of the car 202B) and brake the car 202B more quickly if a possible collision is detected. This may be because the car 206B is outside of a threshold distance from the car 202B, thereby reducing the likelihood of a collision with the trailing car 206B where aggressive braking is employed. As a result, the car 202B may avoid a collision with the car 204B while also ensuring that the likelihood of a collision with the car 206B is reduced, thus making the AEB system safer. As such, the braking distance indicated by the brake lines on the driving surface may be similar length to that of FIG. 2A, but the likelihood of a collision with respect to the car 206B may be reduced (e.g., the car 206B does not include a "!" indicating a possible collision).

Figure 2C:
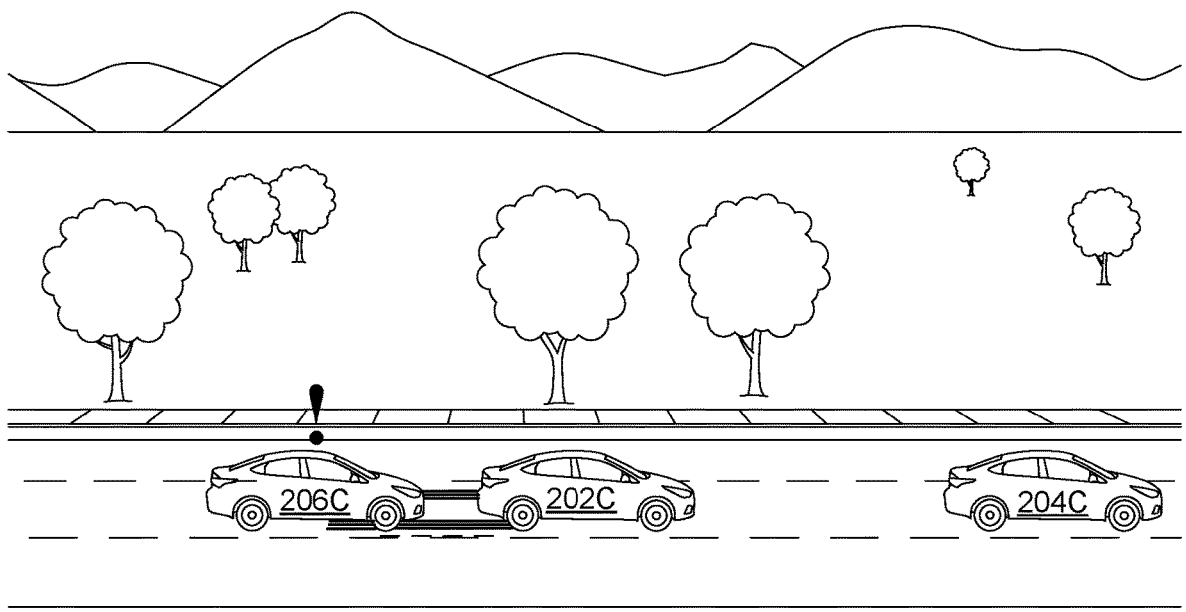

Referring now to FIG. 2C, FIG. 2C shows three cars 202C, 204C, and 206C in the middle lane of a three-lane highway. As shown, the car 206C is within a short distance to the rear of the car 202C, and the car 204C is a further distance in front of the car 202C. Employing embodiments of the system 100 discussed in conjunction with at least FIG. 1, the car 202C may adjust the activation criteria and/or braking profile setting of its AEB system to be less aggressive given the amount of space from the car 204C. As such, the car 202C may adjust the activation criteria to be less sensitive and brake the vehicle less quickly (as indicated by the length of the brake lines on the driving surface as compared to FIGS. 2A, 2B, and 2D) if a possible collision in front of the car 202C is detected because the car 206C is trailing closely behind the rear of the car 202C. In this way, the car 202C may avoid unnecessarily braking or braking too hard and causing an unintended accident with the closely trailing car 206C. In some instances, the car 202C may further adjust the activation criteria and/or braking profile setting of its AEB system if it is determined that the car 204C is slowing down and decreasing its distance from car the 202C. In this case, the activation criteria and/or braking profile settings may be readjusted based the information—such as to brake more aggressively but still not aggressively enough to cause a rear collision with the car 206C.

Figure 2D:
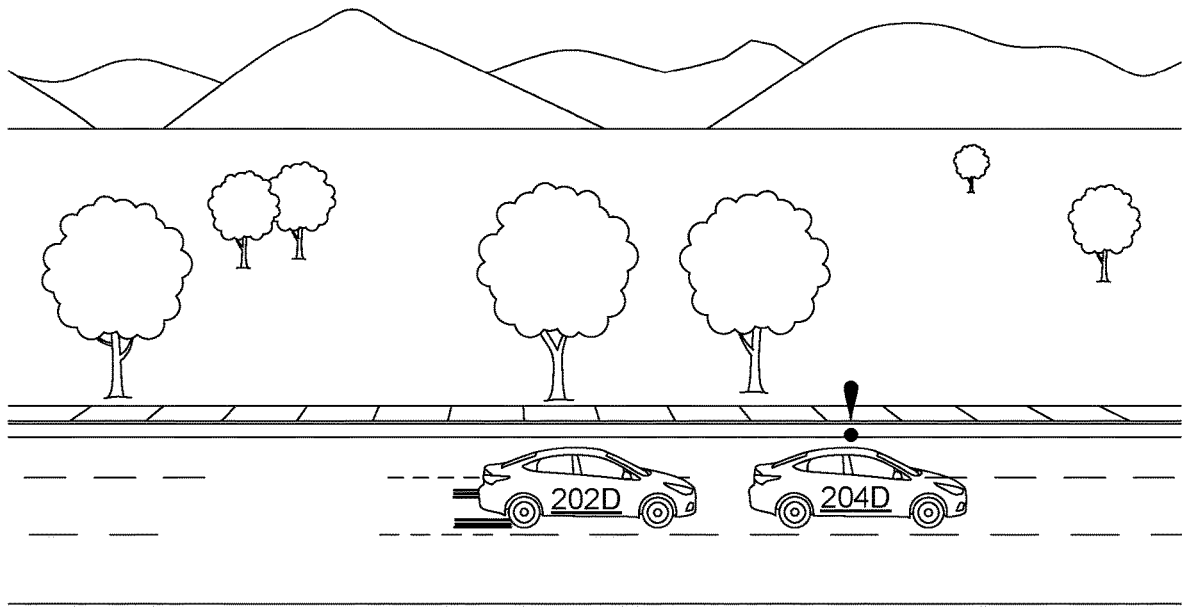

With reference to FIG. 2D, FIG. 2D shows two cars 202D and 204D in the middle lane of a three-lane highway. As shown, the car 204D is within a short distance in front of the car 202D. Employing embodiments of the system 100 discussed in conjunction with at least FIG. 1, the car 202D may adjust the activation criteria and/or braking profile setting of its AEB system to be more aggressive—e.g., because there are no vehicles or other dynamic objects behind the car 202D. As such, the car 202D may adjust the activation criteria to be more sensitive and brake the vehicle more quickly if a possible collision is detected with the car 204D because the potential for a rear collision is minimized. In this way, the car 202D may avoid a collision (indicated by the "!") with the car 204D while also ensuring that the likelihood of a collision with any objects behind car 202D is reduced. The short braking distance is indicated by the length of the brake lines on the driving surface.

With reference again to FIG. 1, once the activation criteria and/or the braking profile are determined, the AEB control component 118 may use this information as input to determine when and how to activate the AEB system of a vehicle. For example, the AEB control component 118 may determine that the activation criteria has been met and generate output to the vehicle control component 120 that causes the vehicle control component to engage the AEB system of the vehicle 400—e.g., via one or more actuation components. Once activated, the AEB system may cause the braking profile to be activated during the execution of the AEB activation. In non-limiting embodiments, the AEB control component 118 may determine whether a threshold level of agreement is met among two or more activation criteria as set by the activation determiner 114 and/or whether a threshold confidence or prediction of an individual activation criteria(s) is met. In this way, different activation criteria may have different agreement levels that must meet a threshold agreement level in order for AEB activation to occur. As such, the vehicle control component 120 may engage the vehicle's AEB system when the activation criteria determined from the activation determiner 114 are met and may apply the braking profile setting determined by the profile determiner 116. Thus, embodiments of the present disclosure may take into account a more holistic view of the surrounding environment of the vehicle 400 when determining when and how to engage the AEB system of the vehicle 400.

Figure 3:
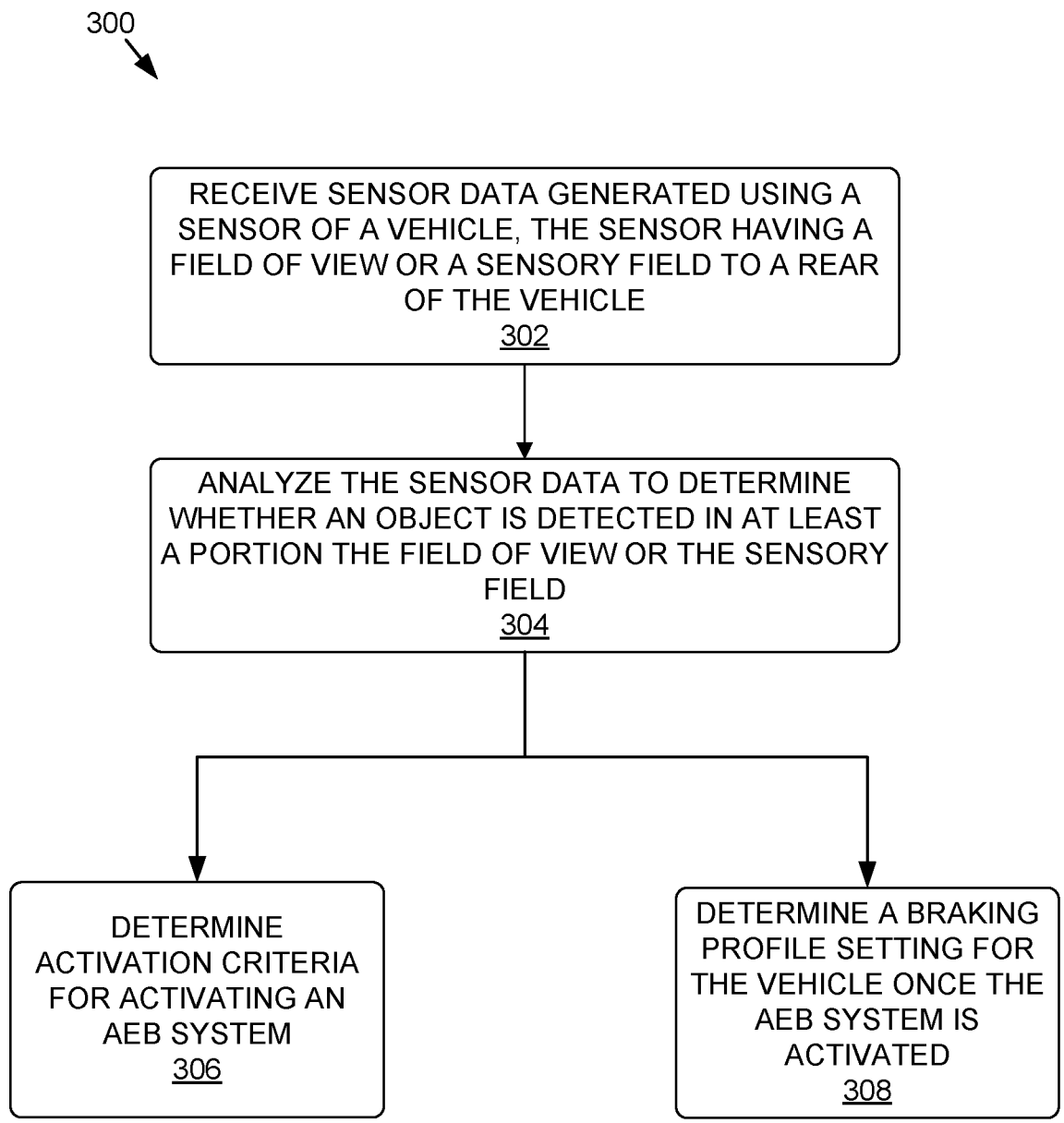
FIG. 3 is a flow diagram showing a method for leveraging rear-view sensors for AEB in autonomous machine applications, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, the method 300 is described, by way of example, with respect to the system of FIG. 1. However, this method 300 may additionally or alternatively be executed by any one system, or any combination of systems, including, but not limited to, those described herein.

FIG. 3 is a flow diagram showing a method 300 leveraging rear-view sensors for automatic emergency braking in autonomous machine applications, in accordance with some embodiments of the present disclosure. The method 300, at block 302, includes receiving sensor data generated using a sensor of a vehicle, the sensor having a field of view or a sensory field to a rear of the vehicle. For example, the sensor data 102—such as the rearward sensor data 106—may be received.

The method 300, at block 304, includes analyzing the sensor data to determine whether an object is detected in at least a portion of the field of view or the sensory field. For example, the vehicle environment analyzer 108 may analyze the sensor data 102 to determine whether a vehicle and/or another dynamic object is present in the field of view and/or the sensor field of a sensor(s) of the vehicle 400.

The method 300, at block 306, includes determining activation criteria for activating an AEB system. For example, the activation determiner 114 may determine activation criteria for activating AEB by the AEB control component 118.

The method 300, at block 308, includes determining a braking profile setting for the vehicle once the AEB system is activated. For example, the profile determiner 116 may determine a braking profile—or a setting corresponding thereto—for the AEB system if the activation criteria is met.

Example Autonomous Vehicle

Figure 4A:
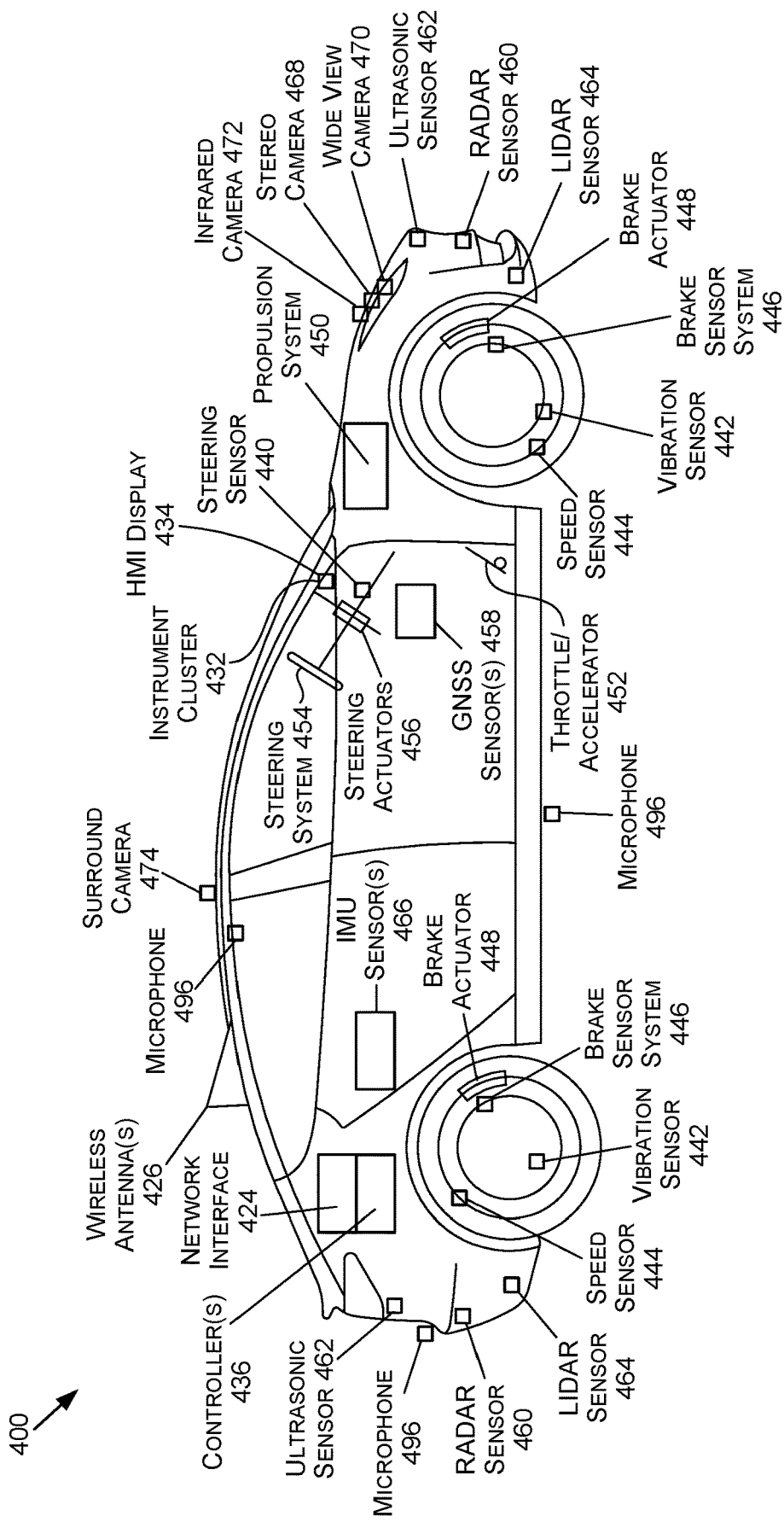
FIG. 4A is an illustration of an example autonomous vehicle, in accordance with some embodiments of the present disclosure.

FIG. 4A is an illustration of an example autonomous vehicle 400, in accordance with some embodiments of the present disclosure. The autonomous vehicle 400 (alternatively referred to herein as the "vehicle 400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 400 may be capable of functionality in accordance with one or more of Level 0-Level 5 of the autonomous driving levels. For example, the vehicle 400 may be capable of momentary assistance (Level 0), driver assistance (Level 1), partial automation (Level 2), conditional automation (Level 3), high automation (Level 4), and/or full automation (Level 5), depending on the embodiment.

The vehicle 400 may include components such as a chassis, a vehicle body, wheels (e.g., 2, 4, 6, 8, 18, etc.), tires, axles, and other components of a vehicle. The vehicle 400 may include a propulsion system 450, such as an internal combustion engine, hybrid electric power plant, an all-electric engine, and/or another propulsion system type. The propulsion system 450 may be connected to a drive train of the vehicle 400, which may include a transmission, to enable the propulsion of the vehicle 400. The propulsion system 450 may be controlled in response to receiving signals from the throttle/accelerator 452.

A steering system 454, which may include a steering wheel, may be used to steer the vehicle 400 (e.g., along a desired path or route) when the propulsion system 450 is operating (e.g., when the vehicle is in motion). The steering system 454 may receive signals from a steering actuator 456. The steering wheel may be optional for full automation (Level 5) functionality.

The brake sensor system 446 may be used to operate the vehicle brakes in response to receiving signals from the brake actuators 448 and/or brake sensors.

Controller(s) 436, which may include one or more system on chips (SoCs) 404 (FIG. 4C) and/or GPU(s), may provide signals (e.g., representative of commands) to one or more components and/or systems of the vehicle 400. For example, the controller(s) may send signals to operate the vehicle brakes via one or more brake actuators 448, to operate the steering system 454 via one or more steering actuators 456, to operate the propulsion system 450 via one or more throttle/accelerators 452. The controller(s) 436 may include one or more onboard (e.g., integrated) computing devices (e.g., supercomputers) that process sensor signals, and output operation commands (e.g., signals representing commands) to enable autonomous driving and/or to assist a human driver in driving the vehicle 400. The controller(s) 436 may include a first controller 436 for autonomous driving functions, a second controller 436 for functional safety functions, a third controller 436 for artificial intelligence functionality (e.g., computer vision), a fourth controller 436 for infotainment functionality, a fifth controller 436 for redundancy in emergency conditions, and/or other controllers. In some examples, a single controller 436 may handle two or more of the above functionalities, two or more controllers 436 may handle a single functionality, and/or any combination thereof.

The controller(s) 436 may provide the signals for controlling one or more components and/or systems of the vehicle 400 in response to sensor data received from one or more sensors (e.g., sensor inputs). The sensor data may be received from, for example and without limitation, global navigation satellite systems sensor(s) 458 (e.g., Global Positioning System sensor(s)), RADAR sensor(s) 460, ultrasonic sensor(s) 462, LIDAR sensor(s) 464, inertial measurement unit (IMU) sensor(s) 466 (e.g., accelerometer(s), gyroscope(s), magnetic compass(es), magnetometer(s), etc.), microphone(s) 496, stereo camera(s) 468, wide-view camera(s) 470 (e.g., fisheye cameras), infrared camera(s) 472, surround camera(s) 474 (e.g., 360 degree cameras), long-range and/or mid-range camera(s) 498, speed sensor(s) 444 (e.g., for measuring the speed of the vehicle 400), vibration sensor(s) 442, steering sensor(s) 440, brake sensor(s) (e.g., as part of the brake sensor system 446), and/or other sensor types.

One or more of the controller(s) 436 may receive inputs (e.g., represented by input data) from an instrument cluster 432 of the vehicle 400 and provide outputs (e.g., represented by output data, display data, etc.) via a human-machine interface (HMI) display 434, an audible annunciator, a loudspeaker, and/or via other components of the vehicle 400. The outputs may include information such as vehicle velocity, speed, time, map data (e.g., the HD map 422 of FIG. 4C), location data (e.g., the vehicle's 400 location, such as on a map), direction, location of other vehicles (e.g., an occupancy grid), information about objects and status of objects as perceived by the controller(s) 436, etc. For example, the HMI display 434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 400 further includes a network interface 424 which may use one or more wireless antenna(s) 426 and/or modem(s) to communicate over one or more networks. For example, the network interface 424 may be capable of communication over LTE, WCDMA, UMTS, GSM, CDMA2000, etc. The wireless antenna(s) 426 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 4B:
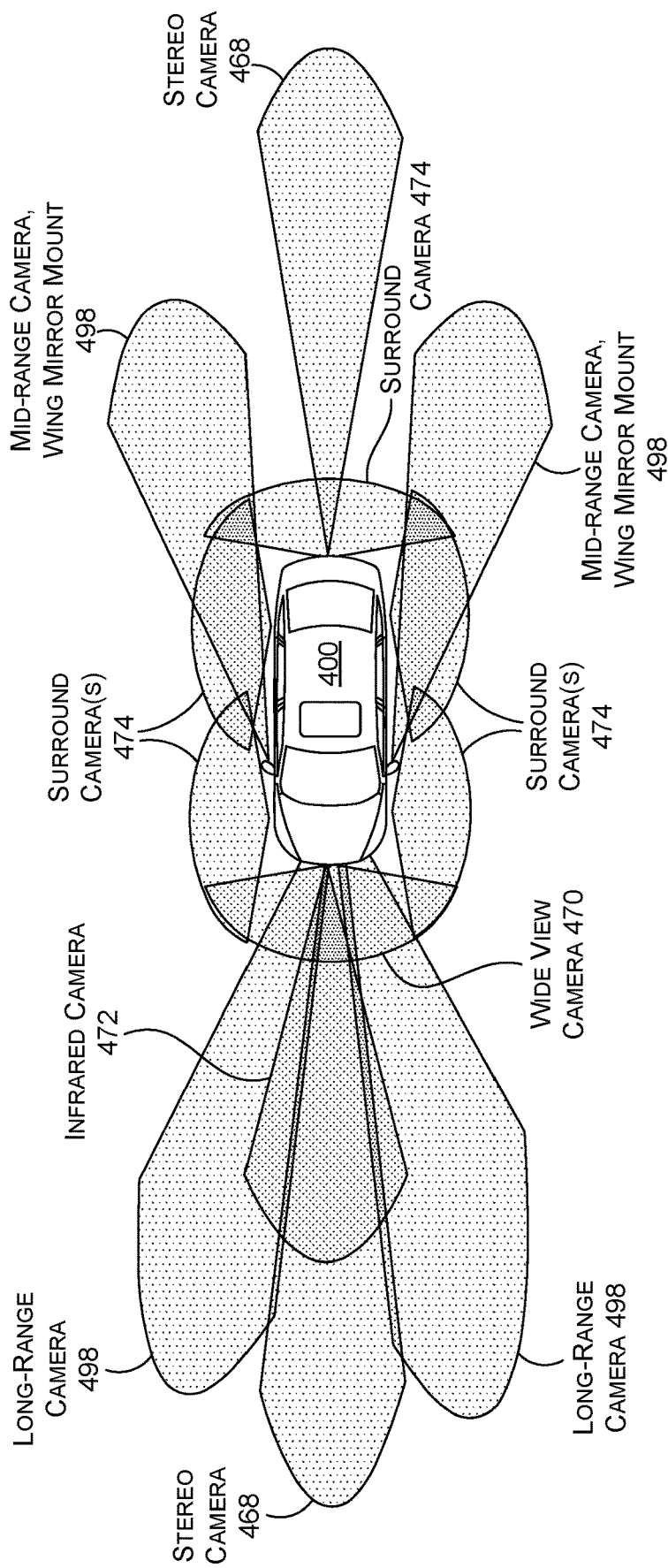
FIG. 4B is an example of camera locations and fields of view for the example autonomous vehicle of FIG. 4A, in accordance with some embodiments of the present disclosure.

FIG. 4B is an example of camera locations and fields of view for the example autonomous vehicle 400 of FIG. 4A, in accordance with some embodiments of the present disclosure. The cameras and respective fields of view are one example embodiment and are not intended to be limiting. For example, additional and/or alternative cameras may be included and/or the cameras may be located at different locations on the vehicle 400.

The camera types for the cameras may include, but are not limited to, digital cameras that may be adapted for use with the components and/or systems of the vehicle 400. The camera(s) may operate at automotive safety integrity level (ASIL) B and/or at another ASIL. The camera types may be capable of any image capture rate, such as 60 frames per second (fps), 420 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 400 (e.g., front-facing cameras) may be used for surround view, to help identify forward facing paths and obstacles, as well aid in, with the help of one or more controllers 436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 470 that may be used to perceive objects coming into view from the periphery (e.g., pedestrians, crossing traffic or bicycles). Although only one wide-view camera is illustrated in FIG. 4B, there may any number of wide-view cameras 470 on the vehicle 400. In addition, long-range camera(s) 498 (e.g., a long-view stereo camera pair) may be used for depth-based object detection, especially for objects for which a neural network has not yet been trained. The long-range camera(s) 498 may also be used for object detection and classification, as well as basic object tracking.

One or more stereo cameras 468 may also be included in a front-facing configuration. The stereo camera(s) 468 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 468 may be used in addition to, or alternatively from, those described herein.

Cameras with a field of view that include portions of the environment to the side of the vehicle 400 (e.g., side-view cameras) may be used for surround view, providing information used to create and update the occupancy grid, as well as to generate side impact collision warnings. For example, surround camera(s) 474 (e.g., four surround cameras 474 as illustrated in FIG. 4B) may be positioned to on the vehicle 400. The surround camera(s) 474 may include wide-view camera(s) 470, fisheye camera(s), 360 degree camera(s), and/or the like. Four example, four fisheye cameras may be positioned on the vehicle's front, rear, and sides. In an alternative arrangement, the vehicle may use three surround camera(s) 474 (e.g., left, right, and rear), and may leverage one or more other camera(s) (e.g., a forward-facing camera) as a fourth surround view camera.

Cameras with a field of view that include portions of the environment to the rear of the vehicle 400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 498, stereo camera(s) 468), infrared camera(s) 472, etc.), as described herein.

Figure 4C:
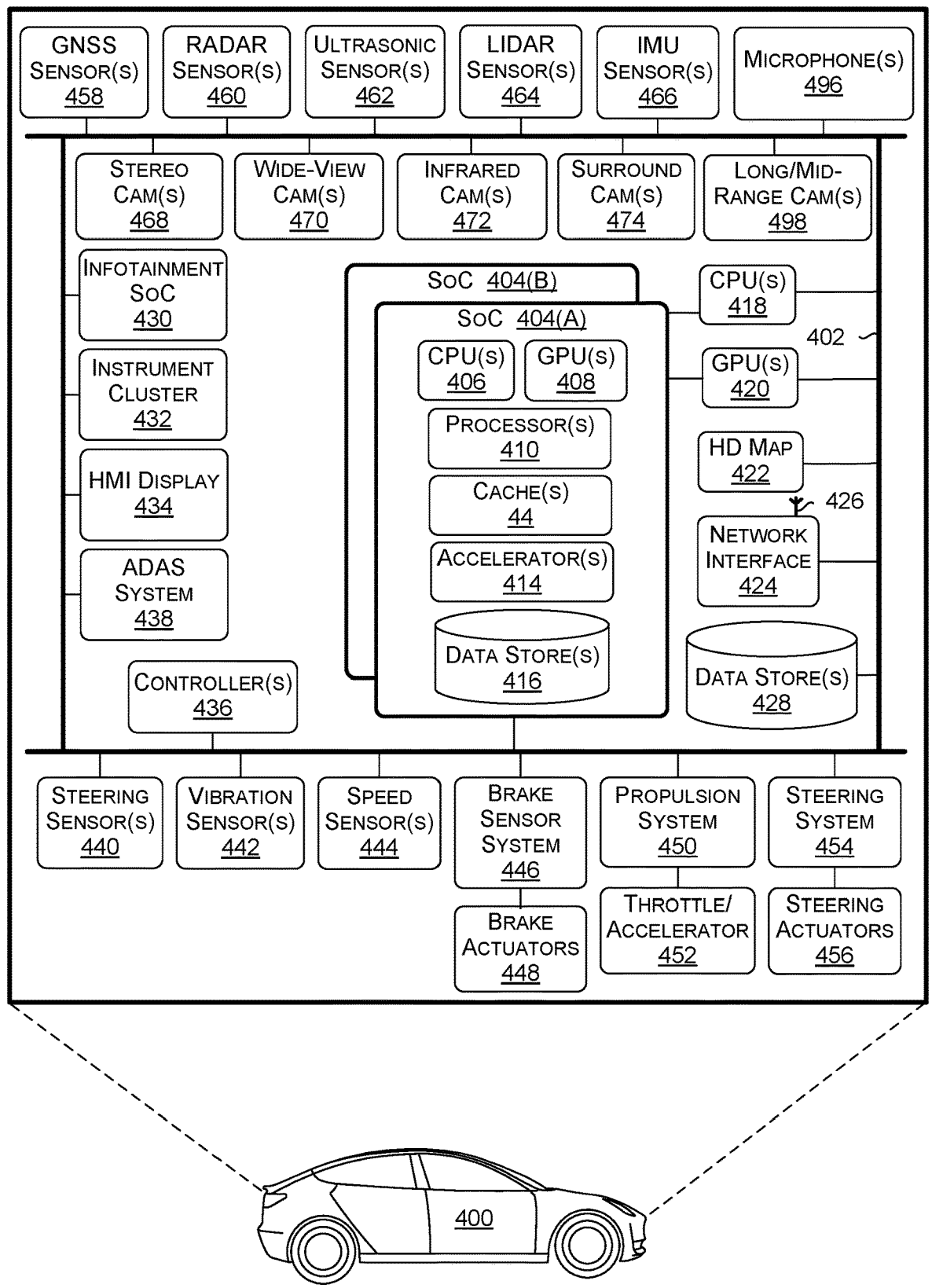
FIG. 4C is a block diagram of an example system architecture for the example autonomous vehicle of FIG. 4A, in accordance with some embodiments of the present disclosure.

FIG. 4C is a block diagram of an example system architecture for the example autonomous vehicle 400 of FIG. 4A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 400 in FIG. 4C are illustrated as being connected via bus 402. The bus 402 may include a Controller Area Network (CAN) data interface (alternatively referred to herein as a "CAN bus"). A CAN may be a network inside the vehicle 400 used to aid in control of various features and functionality of the vehicle 400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 402 is described herein as being a CAN bus, this is not intended to be limiting. For example, in addition to, or alternatively from, the CAN bus, FlexRay and/or Ethernet may be used. Additionally, although a single line is used to represent the bus 402, this is not intended to be limiting. For example, there may be any number of busses 402, which may include one or more CAN busses, one or more FlexRay busses, one or more Ethernet busses, and/or one or more other types of busses using a different protocol. In some examples, two or more busses 402 may be used to perform different functions, and/or may be used for redundancy. For example, a first bus 402 may be used for collision avoidance functionality and a second bus 402 may be used for actuation control. In any example, each bus 402 may communicate with any of the components of the vehicle 400, and two or more busses 402 may communicate with the same components. In some examples, each SoC 404, each controller 436, and/or each computer within the vehicle may have access to the same input data (e.g., inputs from sensors of the vehicle 400), and may be connected to a common bus, such the CAN bus.

The vehicle 400 may include one or more controller(s) 436, such as those described herein with respect to FIG. 4A. The controller(s) 436 may be used for a variety of functions. The controller(s) 436 may be coupled to any of the various other components and systems of the vehicle 400, and may be used for control of the vehicle 400, artificial intelligence of the vehicle 400, infotainment for the vehicle 400, and/or the like.

The vehicle 400 may include a system(s) on a chip (SoC) 404. The SoC 404 may include CPU(s) 406, GPU(s) 408, processor(s) 410, cache(s) 412, accelerator(s) 414, data store(s) 416, and/or other components and features not illustrated. The SoC(s) 404 may be used to control the vehicle 400 in a variety of platforms and systems. For example, the SoC(s) 404 may be combined in a system (e.g., the system of the vehicle 400) with an HD map 422 which may obtain map refreshes and/or updates via a network interface 424 from one or more servers (e.g., server(s) 478 of FIG. 4D).

The CPU(s) 406 may include a CPU cluster or CPU complex (alternatively referred to herein as a "CCPLEX"). The CPU(s) 406 may include multiple cores and/or L2 caches. For example, in some embodiments, the CPU(s) 406 may include eight cores in a coherent multi-processor configuration. In some embodiments, the CPU(s) 406 may include four dual-core clusters where each cluster has a dedicated L2 cache (e.g., a 2 MB L2 cache). The CPU(s) 406 (e.g., the CCPLEX) may be configured to support simultaneous cluster operation enabling any combination of the clusters of the CPU(s) 406 to be active at any given time.

The CPU(s) 406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 408 may include an integrated GPU (alternatively referred to herein as an "iGPU"). The GPU(s) 408 may be programmable and may be efficient for parallel workloads. The GPU(s) 408, in some examples, may use an enhanced tensor instruction set. The GPU(s) 408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 408 may include at least eight streaming microprocessors. The GPU(s) 408 may use compute application programming interface(s) (API(s)). In addition, the GPU(s) 408 may use one or more parallel computing platforms and/or programming models (e.g., NVIDIA's CUDA).

The GPU(s) 408 may be power-optimized for best performance in automotive and embedded use cases. For example, the GPU(s) 408 may be fabricated on a Fin field-effect transistor (FinFET). However, this is not intended to be limiting and the GPU(s) 408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 408 to access the CPU(s) 406 page tables directly. In such examples, when the GPU(s) 408 memory management unit (MMU) experiences a miss, an address translation request may be transmitted to the CPU(s) 406. In response, the CPU(s) 406 may look in its page tables for the virtual-to-physical mapping for the address and transmits the translation back to the GPU(s) 408. As such, unified memory technology may allow a single unified virtual address space for memory of both the CPU(s) 406 and the GPU(s) 408, thereby simplifying the GPU(s) 408 programming and porting of applications to the GPU(s) 408.

In addition, the GPU(s) 408 may include an access counter that may keep track of the frequency of access of the GPU(s) 408 to memory of other processors. The access counter may help ensure that memory pages are moved to the physical memory of the processor that is accessing the pages most frequently.

The SoC(s) 404 may include any number of cache(s) 412, including those described herein. For example, the cache(s) 412 may include an L3 cache that is available to both the CPU(s) 406 and the GPU(s) 408 (e.g., that is connected both the CPU(s) 406 and the GPU(s) 408). The cache(s) 412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 404 may include an arithmetic logic unit(s) (ALU(s)) which may be leveraged in performing processing with respect to any of the variety of tasks or operations of the vehicle 400—such as processing DNNs. In addition, the SoC(s) 404 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 406 and/or GPU(s) 408.

The SoC(s) 404 may include one or more accelerators 414 (e.g., hardware accelerators, software accelerators, or a combination thereof). For example, the SoC(s) 404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 408 and to off-load some of the tasks of the GPU(s) 408 (e.g., to free up more cycles of the GPU(s) 408 for performing other tasks). As an example, the accelerator(s) 414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 408, and by using an inference accelerator, for example, a designer may target either the DLA(s) or the GPU(s) 408 for any function. For example, the designer may focus processing of CNNs and floating point operations on the DLA(s) and leave other functions to the GPU(s) 408 and/or other accelerator(s) 414.

The accelerator(s) 414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 414 (e.g., the hardware acceleration cluster) may include a computer vision network on-chip and SRAM, for providing a high-bandwidth, low latency SRAM for the accelerator(s) 414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 0-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 466 output that correlates with the vehicle 400 orientation, distance, 3D location estimates of the object obtained from the neural network and/or other sensors (e.g., LIDAR sensor(s) 464 or RADAR sensor(s) 460), among others.

The SoC(s) 404 may include data store(s) 416 (e.g., memory). The data store(s) 416 may be on-chip memory of the SoC(s) 404, which may store neural networks to be executed on the GPU and/or the DLA. In some examples, the data store(s) 416 may be large enough in capacity to store multiple instances of neural networks for redundancy and safety. The data store(s) 412 may comprise L2 or L3 cache(s) 412. Reference to the data store(s) 416 may include reference to the memory associated with the PVA, DLA, and/or other accelerator(s) 414, as described herein.

The SoC(s) 404 may include one or more processor(s) 410 (e.g., embedded processors). The processor(s) 410 may include a boot and power management processor that may be a dedicated processor and subsystem to handle boot power and management functions and related security enforcement. The boot and power management processor may be a part of the SoC(s) 404 boot sequence and may provide runtime power management services. The boot power and management processor may provide clock and voltage programming, assistance in system low power state transitions, management of SoC(s) 404 thermals and temperature sensors, and/or management of the SoC(s) 404 power states. Each temperature sensor may be implemented as a ring-oscillator whose output frequency is proportional to temperature, and the SoC(s) 404 may use the ring-oscillators to detect temperatures of the CPU(s) 406, GPU(s) 408, and/or accelerator(s) 414. If temperatures are determined to exceed a threshold, the boot and power management processor may enter a temperature fault routine and put the SoC(s) 404 into a lower power state and/or put the vehicle 400 into a chauffeur to safe stop mode (e.g., bring the vehicle 400 to a safe stop).

The processor(s) 410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 410 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 410 may further include a real-time camera engine that may include a dedicated processor subsystem for handling real-time camera management.

The processor(s) 410 may further include a high-dynamic range signal processor that may include an image signal processor that is a hardware engine that is part of the camera processing pipeline.

The processor(s) 410 may include a video image compositor that may be a processing block (e.g., implemented on a microprocessor) that implements video post-processing functions needed by a video playback application to produce the final image for the player window. The video image compositor may perform lens distortion correction on wide-view camera(s) 470, surround camera(s) 474, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 408 is not required to continuously render new surfaces. Even when the GPU(s) 408 is powered on and active doing 3D rendering, the video image compositor may be used to offload the GPU(s) 408 to improve performance and responsiveness.

The SoC(s) 404 may further include a mobile industry processor interface (MIPI) camera serial interface for receiving video and input from cameras, a high-speed interface, and/or a video input block that may be used for camera and related pixel input functions. The SoC(s) 404 may further include an input/output controller(s) that may be controlled by software and may be used for receiving I/O signals that are uncommitted to a specific role.

The SoC(s) 404 may further include a broad range of peripheral interfaces to enable communication with peripherals, audio codecs, power management, and/or other devices. The SoC(s) 404 may be used to process data from cameras (e.g., connected over Gigabit Multimedia Serial Link and Ethernet), sensors (e.g., LIDAR sensor(s) 464, RADAR sensor(s) 460, etc. that may be connected over Ethernet), data from bus 402 (e.g., speed of vehicle 400, steering wheel position, etc.), data from GNSS sensor(s) 458 (e.g., connected over Ethernet or CAN bus). The SoC(s) 404 may further include dedicated high-performance mass storage controllers that may include their own DMA engines, and that may be used to free the CPU(s) 406 from routine data management tasks.

The SoC(s) 404 may be an end-to-end platform with a flexible architecture that spans automation levels 0-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 404 may be faster, more reliable, and even more energy-efficient and space-efficient than conventional systems. For example, the accelerator(s) 414, when combined with the CPU(s) 406, the GPU(s) 408, and the data store(s) 416, may provide for a fast, efficient platform for level 0-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 0-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 0-5 autonomous driving functionality. For example, a CNN executing on the DLA or dGPU (e.g., the GPU(s) 420) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 408.

In some examples, a CNN for facial recognition and vehicle owner identification may use data from camera sensors to identify the presence of an authorized driver and/or owner of the vehicle 400. The always on sensor processing engine may be used to unlock the vehicle when the owner approaches the driver door and turn on the lights, and, in security mode, to disable the vehicle when the owner leaves the vehicle. In this way, the SoC(s) 404 provide for security against theft and/or carjacking.

In another example, a CNN for emergency vehicle detection and identification may use data from microphones 496 to detect and identify emergency vehicle sirens. In contrast to conventional systems, that use general classifiers to detect sirens and manually extract features, the SoC(s) 404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 462, until the emergency vehicle(s) passes.

The vehicle may include a CPU(s) 418 (e.g., discrete CPU(s), or dCPU(s)), that may be coupled to the SoC(s) 404 via a high-speed interconnect (e.g., PCIe). The CPU(s) 418 may include an X86 processor, for example. The CPU(s) 418 may be used to perform any of a variety of functions, including arbitrating potentially inconsistent results between ADAS sensors and the SoC(s) 404, and/or monitoring the status and health of the controller(s) 436 and/or infotainment SoC 430, for example.

The vehicle 400 may include a GPU(s) 420 (e.g., discrete GPU(s), or dGPU(s)), that may be coupled to the SoC(s) 404 via a high-speed interconnect (e.g., NVIDIA's NVLINK). The GPU(s) 420 may provide additional artificial intelligence functionality, such as by executing redundant and/or different neural networks, and may be used to train and/or update neural networks based on input (e.g., sensor data) from sensors of the vehicle 400.

The vehicle 400 may further include the network interface 424 which may include one or more wireless antennas 426 (e.g., one or more wireless antennas for different communication protocols, such as a cellular antenna, a Bluetooth antenna, etc.). The network interface 424 may be used to enable wireless connectivity over the Internet with the cloud (e.g., with the server(s) 478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 400 information about vehicles in proximity to the vehicle 400 (e.g., vehicles in front of, on the side of, and/or behind the vehicle 400). This functionality may be part of a cooperative adaptive cruise control functionality of the vehicle 400.

The network interface 424 may include a SoC that provides modulation and demodulation functionality and enables the controller(s) 436 to communicate over wireless networks. The network interface 424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 400 may further include data store(s) 428 which may include off-chip (e.g., off the SoC(s) 404) storage. The data store(s) 428 may include one or more storage elements including RAM, SRAM, DRAM, VRAM, Flash, hard disks, and/or other components and/or devices that may store at least one bit of data.

The vehicle 400 may further include GNSS sensor(s) 458. The GNSS sensor(s) 458 (e.g., GPS and/or assisted GPS sensors), to assist in mapping, perception, occupancy grid generation, and/or path planning functions. Any number of GNSS sensor(s) 458 may be used, including, for example and without limitation, a GPS using a USB connector with an Ethernet to Serial (RS-232) bridge.

The vehicle 400 may further include RADAR sensor(s) 460. The RADAR sensor(s) 460 may be used by the vehicle 400 for long-range vehicle detection, even in darkness and/or severe weather conditions. RADAR functional safety levels may be ASIL B. The RADAR sensor(s) 460 may use the CAN and/or the bus 402 (e.g., to transmit data generated by the RADAR sensor(s) 460) for control and to access object tracking data, with access to Ethernet to access raw data in some examples. A wide variety of RADAR sensor types may be used. For example, and without limitation, the RADAR sensor(s) 460 may be suitable for front, rear, and side RADAR use. In some example, Pulse Doppler RADAR sensor(s) are used.

The RADAR sensor(s) 460 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 400 surroundings at higher speeds with minimal interference from traffic in adjacent lanes. The other two antennae may expand the field of view, making it possible to quickly detect vehicles entering or leaving the vehicle's 400 lane.

Mid-range RADAR systems may include, as an example, a range of up to 460 m (front) or 80 m (rear), and a field of view of up to 42 degrees (front) or 450 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 400 may further include ultrasonic sensor(s) 462. The ultrasonic sensor(s) 462, which may be positioned at the front, back, and/or the sides of the vehicle 400, may be used for park assist and/or to create and update an occupancy grid. A wide variety of ultrasonic sensor(s) 462 may be used, and different ultrasonic sensor(s) 462 may be used for different ranges of detection (e.g., 2.5 m, 4 m). The ultrasonic sensor(s) 462 may operate at functional safety levels of ASIL B.

The vehicle 400 may include LIDAR sensor(s) 464. The LIDAR sensor(s) 464 may be used for object and pedestrian detection, emergency braking, collision avoidance, and/or other functions. The LIDAR sensor(s) 464 may be functional safety level ASIL B. In some examples, the vehicle 400 may include multiple LIDAR sensors 464 (e.g., two, four, six, etc.) that may use Ethernet (e.g., to provide data to a Gigabit Ethernet switch).

In some examples, the LIDAR sensor(s) 464 may be capable of providing a list of objects and their distances for a 360-degree field of view. Commercially available LIDAR sensor(s) 464 may have an advertised range of approximately 400 m, with an accuracy of 2 cm-3 cm, and with support for a 400 Mbps Ethernet connection, for example. In some examples, one or more non-protruding LIDAR sensors 464 may be used. In such examples, the LIDAR sensor(s) 464 may be implemented as a small device that may be embedded into the front, rear, sides, and/or corners of the vehicle 400. The LIDAR sensor(s) 464, in such examples, may provide up to a 420-degree horizontal and 35-degree vertical field-of-view, with a 200 m range even for low-reflectivity objects. Front-mounted LIDAR sensor(s) 464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 400. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 464 may be less susceptible to motion blur, vibration, and/or shock.

The vehicle may further include IMU sensor(s) 466. The IMU sensor(s) 466 may be located at a center of the rear axle of the vehicle 400, in some examples. The IMU sensor(s) 466 may include, for example and without limitation, an accelerometer(s), a magnetometer(s), a gyroscope(s), a magnetic compass(es), and/or other sensor types. In some examples, such as in six-axis applications, the IMU sensor(s) 466 may include accelerometers and gyroscopes, while in nine-axis applications, the IMU sensor(s) 466 may include accelerometers, gyroscopes, and magnetometers.

In some embodiments, the IMU sensor(s) 466 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 466 may enable the vehicle 400 to estimate heading without requiring input from a magnetic sensor by directly observing and correlating the changes in velocity from GPS to the IMU sensor(s) 466. In some examples, the IMU sensor(s) 466 and the GNSS sensor(s) 458 may be combined in a single integrated unit.

The vehicle may include microphone(s) 496 placed in and/or around the vehicle 400. The microphone(s) 496 may be used for emergency vehicle detection and identification, among other things.

The vehicle may further include any number of camera types, including stereo camera(s) 468, wide-view camera(s) 470, infrared camera(s) 472, surround camera(s) 474, long-range and/or mid-range camera(s) 498, and/or other camera types. The cameras may be used to capture image data around an entire periphery of the vehicle 400. The types of cameras used depends on the embodiments and requirements for the vehicle 400, and any combination of camera types may be used to provide the necessary coverage around the vehicle 400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 4A and FIG. 4B.

The vehicle 400 may further include vibration sensor(s) 442. The vibration sensor(s) 442 may measure vibrations of components of the vehicle, such as the axle(s). For example, changes in vibrations may indicate a change in road surfaces. In another example, when two or more vibration sensors 442 are used, the differences between the vibrations may be used to determine friction or slippage of the road surface (e.g., when the difference in vibration is between a power-driven axle and a freely rotating axle).

The vehicle 400 may include an ADAS system 438. The ADAS system 438 may include a SoC, in some examples. The ADAS system 438 may include autonomous/adaptive/automatic cruise control (ACC), cooperative adaptive cruise control (CACC), forward crash warning (FCW) (alternatively referred to as collision mitigation warning (CMW)), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 460, LIDAR sensor(s) 464, and/or a camera(s). The ACC systems may include longitudinal ACC and/or lateral ACC. Longitudinal ACC monitors and controls the distance to the vehicle immediately ahead of the vehicle 400 and automatically adjust the vehicle speed to maintain a safe distance from vehicles ahead. Lateral ACC performs distance keeping, and advises the vehicle 400 to change lanes when necessary. Lateral ACC is related to other ADAS applications such as LCA and CWS.

CACC uses information from other vehicles that may be received via the network interface 424 and/or the wireless antenna(s) 426 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link In general, the V2V communication concept provides information about the immediately preceding vehicles (e.g., vehicles immediately ahead of and in the same lane as the vehicle 400), while the I2V communication concept provides information about traffic further ahead. CACC systems may include either or both I2V and V2V information sources. Given the information of the vehicles ahead of the vehicle 400, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 400 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 400 if the vehicle 400 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 400 is backing up. Some RCTW systems include AEB to ensure that the vehicle brakes are applied to avoid a crash. RCTW systems may use one or more rear-facing RADAR sensor(s) 460, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 400, the vehicle 400 itself must, in the case of conflicting results, decide whether to heed the result from a primary computer or a secondary computer (e.g., a first controller 436 or a second controller 436). For example, in some embodiments, the ADAS system 438 may be a backup and/or secondary computer for providing perception information to a backup computer rationality module. The backup computer rationality monitor may run a redundant diverse software on hardware components to detect faults in perception and dynamic driving tasks. Outputs from the ADAS system 438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 404.

In other examples, ADAS system 438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 438 may be fed into the primary computer's perception block and/or the primary computer's dynamic driving task block. For example, if the ADAS system 438 indicates a forward crash warning due to an object immediately ahead, the perception block may use this information when identifying objects. In other examples, the secondary computer may have its own neural network which is trained and thus reduces the risk of false positives, as described herein.

The vehicle 400 may further include the infotainment SoC 430 (e.g., an in-vehicle infotainment system (IVI)). Although illustrated and described as a SoC, the infotainment system may not be a SoC, and may include two or more discrete components. The infotainment SoC 430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 400. For example, the infotainment SoC 430 may radios, disk players, navigation systems, video players, USB and Bluetooth connectivity, carputers, in-car entertainment, Wi-Fi, steering wheel audio controls, hands free voice control, a heads-up display (HUD), an HMI display 434, a telematics device, a control panel (e.g., for controlling and/or interacting with various components, features, and/or systems), and/or other components. The infotainment SoC 430 may further be used to provide information (e.g., visual and/or audible) to a user(s) of the vehicle, such as information from the ADAS system 438, autonomous driving information such as planned vehicle maneuvers, trajectories, surrounding environment information (e.g., intersection information, vehicle information, road information, etc.), and/or other information.

The infotainment SoC 430 may include GPU functionality. The infotainment SoC 430 may communicate over the bus 402 (e.g., CAN bus, Ethernet, etc.) with other devices, systems, and/or components of the vehicle 400. In some examples, the infotainment SoC 430 may be coupled to a supervisory MCU such that the GPU of the infotainment system may perform some self-driving functions in the event that the primary controller(s) 436 (e.g., the primary and/or backup computers of the vehicle 400) fail. In such an example, the infotainment SoC 430 may put the vehicle 400 into a chauffeur to safe stop mode, as described herein.

The vehicle 400 may further include an instrument cluster 432 (e.g., a digital dash, an electronic instrument cluster, a digital instrument panel, etc.). The instrument cluster 432 may include a controller and/or supercomputer (e.g., a discrete controller or supercomputer). The instrument cluster 432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 430 and the instrument cluster 432. In other words, the instrument cluster 432 may be included as part of the infotainment SoC 430, or vice versa.

Figure 4D:
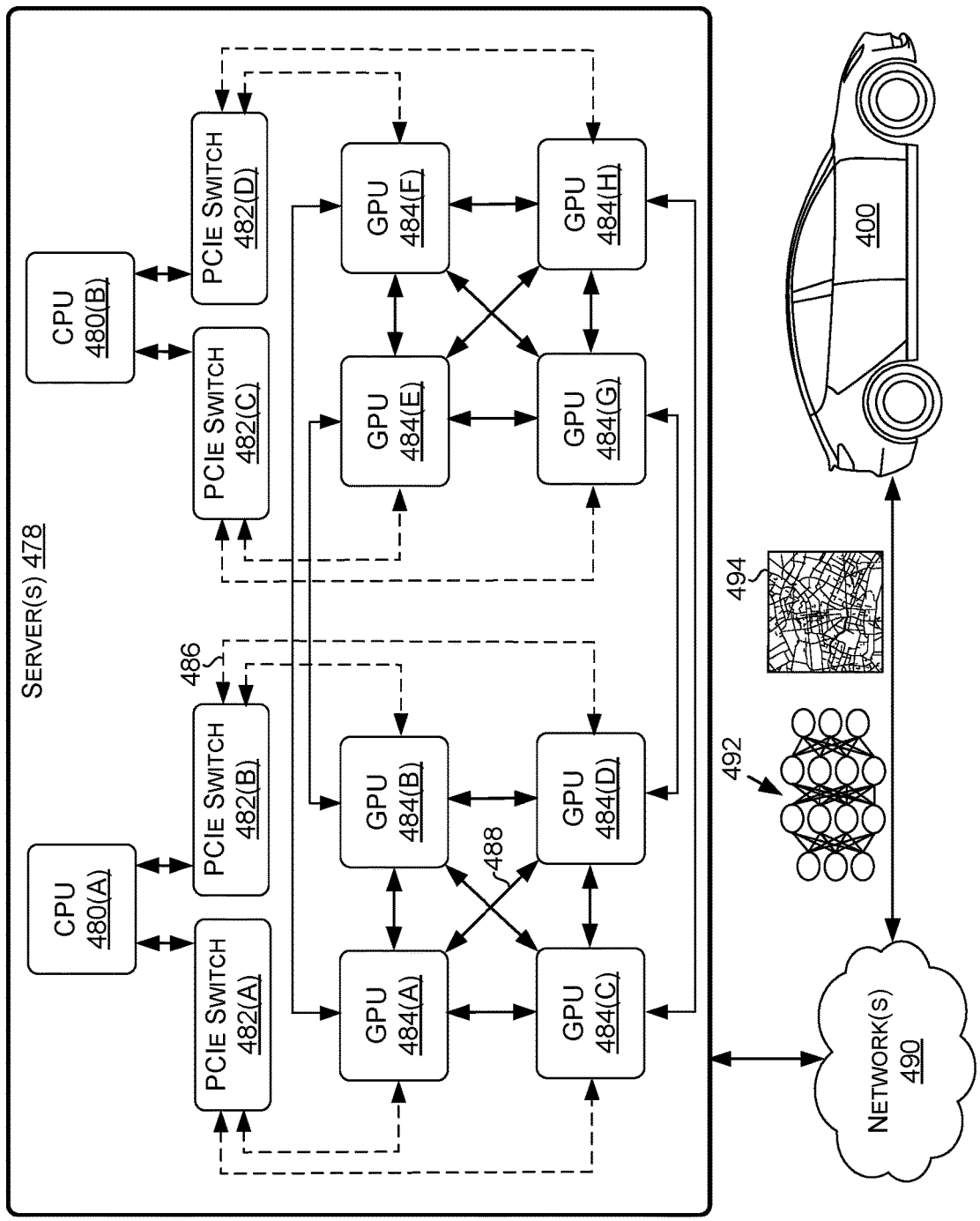
FIG. 4D is a system diagram for communication between cloud-based server(s) and the example autonomous vehicle of FIG. 4A, in accordance with some embodiments of the present disclosure.

FIG. 4D is a system diagram for communication between cloud-based server(s) and the example autonomous vehicle 400 of FIG. 4A, in accordance with some embodiments of the present disclosure. The system 476 may include server(s) 478, network(s) 490, and vehicles, including the vehicle 400. The server(s) 478 may include a plurality of GPUs 484(A)-484(H) (collectively referred to herein as GPUs 484), PCIe switches 482(A)-482(H) (collectively referred to herein as PCIe switches 482), and/or CPUs 480(A)-480(B) (collectively referred to herein as CPUs 480). The GPUs 484, the CPUs 480, and the PCIe switches may be interconnected with high-speed interconnects such as, for example and without limitation, NVLink interfaces 488 developed by NVIDIA and/or PCIe connections 486. In some examples, the GPUs 484 are connected via NVLink and/or NVSwitch SoC and the GPUs 484 and the PCIe switches 482 are connected via PCIe interconnects. Although eight GPUs 484, two CPUs 480, and two PCIe switches are illustrated, this is not intended to be limiting. Depending on the embodiment, each of the server(s) 478 may include any number of GPUs 484, CPUs 480, and/or PCIe switches. For example, the server(s) 478 may each include eight, sixteen, thirty-two, and/or more GPUs 484.

The server(s) 478 may receive, over the network(s) 490 and from the vehicles, image data representative of images showing unexpected or changed road conditions, such as recently commenced road-work. The server(s) 478 may transmit, over the network(s) 490 and to the vehicles, neural networks 492, updated neural networks 492, and/or map information 494, including information regarding traffic and road conditions. The updates to the map information 494 may include updates for the HD map 422, such as information regarding construction sites, potholes, detours, flooding, and/or other obstructions. In some examples, the neural networks 492, the updated neural networks 492, and/or the map information 494 may have resulted from new training and/or experiences represented in data received from any number of vehicles in the environment, and/or based on training performed at a datacenter (e.g., using the server(s) 478 and/or other servers).

The server(s) 478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 490, and/or the machine learning models may be used by the server(s) 478 to remotely monitor the vehicles.

In some examples, the server(s) 478 may receive data from the vehicles and apply the data to up-to-date real-time neural networks for real-time intelligent inferencing. The server(s) 478 may include deep-learning supercomputers and/or dedicated AI computers powered by GPU(s) 484, such as a DGX and DGX Station machines developed by NVIDIA. However, in some examples, the server(s) 478 may include deep learning infrastructure that use only CPU-powered datacenters.

The deep-learning infrastructure of the server(s) 478 may be capable of fast, real-time inferencing, and may use that capability to evaluate and verify the health of the processors, software, and/or associated hardware in the vehicle 400. For example, the deep-learning infrastructure may receive periodic updates from the vehicle 400, such as a sequence of images and/or objects that the vehicle 400 has located in that sequence of images (e.g., via computer vision and/or other machine learning object classification techniques). The deep-learning infrastructure may run its own neural network to identify the objects and compare them with the objects identified by the vehicle 400 and, if the results do not match and the infrastructure concludes that the AI in the vehicle 400 is malfunctioning, the server(s) 478 may transmit a signal to the vehicle 400 instructing a fail-safe computer of the vehicle 400 to assume control, notify the passengers, and complete a safe parking maneuver.

For inferencing, the server(s) 478 may include the GPU(s) 484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 5:
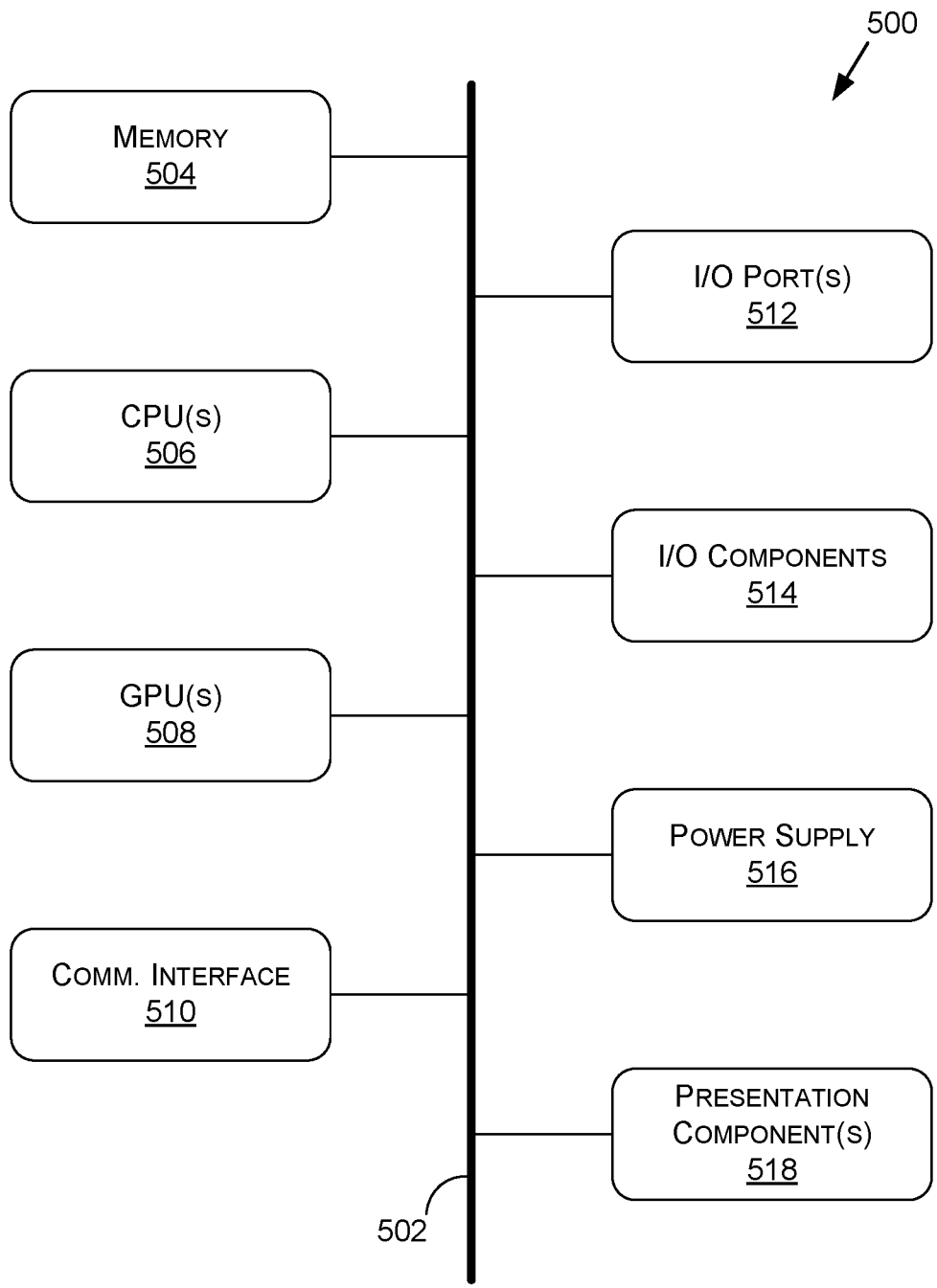
FIG. 5 is a block diagram of an example computing device suitable for use in implementing some embodiments of the present disclosure.

FIG. 5 is a block diagram of an example computing device 500 suitable for use in implementing some embodiments of the present disclosure. Computing device 500 may include a bus 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, and one or more presentation components 518 (e.g., display(s)).

Although the various blocks of FIG. 5 are shown as connected via the bus 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 5.

The bus 502 may represent one or more busses, such as an address bus, a data bus, a control bus, or a combination thereof. The bus 502 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 506 may be configured to execute the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an ARM processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

The GPU(s) 508 may be used by the computing device 500 to render graphics (e.g., 3D graphics). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data. The display memory may be included as part of the memory 504. The GPU(s) 708 may include two or more GPUs operating in parallel (e.g., via a link) When combined together, each GPU 508 may generate pixel data for different portions of an output image or for different output images (e.g., a first GPU for a first image and a second GPU for a second image). Each GPU may include its own memory, or may share memory with other GPUs.

In examples where the computing device 500 does not include the GPU(s) 508, the CPU(s) 506 may be used to render graphics.

The communication interface 510 may include one or more receivers, transmitters, and/or transceivers that enable the computing device 700 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    analyzing sensor data obtained using at least one sensor of a machine in an environment to detect a first object in at least one sensory field of the at least one sensor;
    based at least on the first object being detected in the environment, configuring one or more settings for an automatic emergency braking (AEB) system or a collision mitigation warning (CMW) system associated with the machine to reduce a likelihood of a collision with the first object at a first location relative to the machine that would be caused by one or more of the AEB system or CMW system being triggered by a second object at a second location relative to the machine; and
    based at least on the second object being detected in the environment, triggering one or more of the AEB system or the CMW system according to the one or more settings.

2. The method of claim 1, wherein the configuring the one or more settings includes adjusting a confidence threshold for determining whether an activation criterion used for the triggering is satisfied.

3. The method of claim 1, wherein the configuring the one or more settings includes modifying a braking profile used by the AEB system to control braking.

4. The method of claim 1, wherein the configuring the one or more settings includes setting a threshold level of agreement for the triggering to occur, the threshold level of agreement being between at least a first activation path for the triggering and a second activation path for the triggering, the first activation path being separate from the second activation path.

5. The method of claim 1, wherein the first object is detected using the at least one sensory field of the at least one sensor and the second object is detected using at least one second sensory field of at least one second sensor of the machine.

6. The method of claim 1, wherein the one or more settings correspond to an aggressiveness of braking using the AEB system, and the aggressiveness is based at least on the second object being detected.

7. The method of claim 1, wherein the first location is at a side or a rear of the machine and the second location is at a front of the machine.

8. The method of claim 1, wherein the triggering includes:
    after the configuring, detecting the second object is within a threshold distance of the machine;
    based at least on the detecting the second object is within the threshold distance, determining, using the one or more settings, that at least one activation criterion for the triggering is satisfied; and
    based at least on the determining that the at least one activation criterion is satisfied, initiating the one or more of the AEB system or the CMW system.

9. The method of claim 1, further comprising, based at least on the triggering, initiating operation of the one or more of the AEB system or the CMW system, wherein the configuring alters the operation of the one or more of the AEB system or the CMW system in accordance with the one or more settings.

10. The method of claim 1, wherein the first location is at a first side of the machine and the second location is at a second side of the machine that is opposite to the first side.

11. A system comprising:
    one or more processors to perform operations including:
        detecting, based at least on sensor data obtained using at least one sensor of a machine in an environment, a first object to a rear of the machine;
        based at least on the detecting the first object to the rear of the machine, configuring, to reduce a likelihood of collision with the first object at a first location relative to the machine that would be caused by one or more of a collision mitigation action for the machine or a presentation of a collision warning indicator for the machine being triggered by a second object at a second location relative to the machine, at least one of:
  one or more first settings corresponding to the collision mitigation action for the machine; or
  one or more second settings corresponding to the presentation of the collision warning indicator for the machine; and
based at least on detecting the second object in the environment, triggering at least one of:
  the collision mitigation action according to the one or more first settings; or
  the presentation of the collision warning indicator according to the one or more second settings.

12. The system of claim 11, wherein at least one of the configuring the one or more first settings or the configuring the one or more second settings includes adjusting a confidence threshold for determining whether an activation criterion used for the triggering is satisfied.

13. The system of claim 11, wherein the configuring the one or more first settings includes modifying a braking profile used by the collision mitigation action to control braking.

14. The system of claim 11, wherein the first object is detected in at least one first sensory field and the second object is detected in at least one second sensory field.

15. The system of claim 11, wherein the one or more first settings correspond to an aggressiveness of braking using the collision mitigation action and the aggressiveness is based at least on the second object being to the rear of the machine.

16. The system of claim 11, wherein the system is comprised in at least one of:
  a control system for an autonomous or semi-autonomous machine;
  a perception system for an autonomous or semi-autonomous machine;
  a system for performing simulation operations;
  a system for performing light transport simulation;
  a system for performing deep learning operations;
  a system implemented at least partially in a data center; or
  a system implemented at least partially using cloud computing resources.

17. One or more processors comprising:
processing circuitry to trigger one or more of an automatic emergency braking (AEB) system or a collision mitigation warning (CMW) system associated with a machine based at least on detecting a first object, wherein:
  based at least on configuring one or more settings for the AEB system or the CMW system, the one or more settings are applied to the one or more of the AEB system or the CMW system to reduce a likelihood of a collision with a second object at a first location relative to the machine that would be caused by one or more of the AEB system or CMW system being triggered by the first object at a second location relative to the machine, and
  the configuring is based at least on an analysis of sensor data obtained using at least one sensor to detect the second object in at least one sensory field of the at least one sensor.

18. The one or more processors of claim 17, wherein the configuring the one or more settings includes adjusting a confidence threshold for determining whether an activation criterion used for the triggering is satisfied.

19. The one or more processors of claim 17, wherein the configuring the one or more settings includes modifying a braking profile used by the AEB system to control braking.

20. The one or more processors of claim 17, wherein the one or more processors is comprised in at least one of:
  a control system for an autonomous or semi-autonomous machine;
  a perception system for an autonomous or semi-autonomous machine;
  a system for performing simulation operations;
  a system for performing light transport simulation;
  a system for performing deep learning operations;
  a system implemented at least partially in a data center; or
  a system implemented at least partially using cloud computing resources.

* * * * *